United States Patent
Dareddy et al.

(10) Patent No.: US 12,039,513 B2
(45) Date of Patent: Jul. 16, 2024

(54) SYSTEM, METHOD, AND COMPUTER PROGRAM PRODUCT FOR GENERATING EMBEDDINGS FOR OBJECTS

(71) Applicant: Visa International Service Association, San Francisco, CA (US)

(72) Inventors: Manoj Reddy Dareddy, Los Angeles, CA (US); Mahashweta Das, Sunnyvale, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 368 days.

(21) Appl. No.: 17/297,000

(22) PCT Filed: Dec. 2, 2019

(86) PCT No.: PCT/US2019/063953
§ 371 (c)(1),
(2) Date: May 26, 2021

(87) PCT Pub. No.: WO2020/113208
PCT Pub. Date: Jun. 4, 2020

(65) Prior Publication Data
US 2022/0327514 A1 Oct. 13, 2022

Related U.S. Application Data

(60) Provisional application No. 62/773,264, filed on Nov. 30, 2018.

(51) Int. Cl.
*G06Q 20/30* (2012.01)
(52) U.S. Cl.
CPC ................... *G06Q 20/30* (2013.01)

(58) Field of Classification Search
CPC ..................................................... G06Q 20/30
(Continued)

(56) References Cited

U.S. PATENT DOCUMENTS 7,130,773 B1 * 10/2006 Wong ..................... H04W 4/70
709/227
8,620,940 B1 * 12/2013 Hostetter .................. G06F 7/02
707/758
(Continued)

FOREIGN PATENT DOCUMENTS

CN 111008196 A * 4/2020

OTHER PUBLICATIONS

Chang et al. Heterogeneous Network Embedding via Deep Architectures. KDD '15: Proceedings of the 21th ACM SIGKDD International Conference on Knowledge Discovery and Data Mining. Aug. 2015. pp. 119-128. (Year: 2015).*

(Continued)

*Primary Examiner* — Virpi H Kanervo
(74) *Attorney, Agent, or Firm* — The Webb Law Firm

(57) ABSTRACT

Provided are computer-implemented methods for generating embeddings for objects which may include receiving heterogeneous network data associated with a plurality of objects in a heterogeneous network; selecting at least one pattern of objects; determining instances of each pattern of objects based on the heterogeneous network data; generating a pattern matrix for each pattern of objects based on the instances of the pattern of objects; generating pattern sequence data associated with a portion of each pattern matrix; generating network sequence data associated with a portion of the heterogeneous network data; and combining the pattern sequence data and the network sequence data into combined sequence data. In some non-limiting embodiments or aspects, methods may include generating a vector (Continued)

for each object of the plurality of objects based on the combined sequence data. Systems and computer program products are also provided.

20 Claims, 13 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2017/0061294 A1 | 3/2017 | Weston et al. | |
| 2017/0337262 A1 | 11/2017 | Smith et al. | |
| 2018/0032587 A1* | 2/2018 | Abdelhamid | ....... G06F 16/9024 |

OTHER PUBLICATIONS

K. Xu, Y. Qu and K. Yang, "A tutorial on the internet of things: from a heterogeneous network integration perspective," in IEEE Network, vol. 30, No. 2, pp. 102-108, Mar.-Apr. 2016. (Year: 2016).*
Chen, Hongxu, et al. "PME: projected metric embedding on heterogeneous networks for link prediction." Proceedings of the 24th ACM SIGKDD international conference on knowledge discovery & data mining. (Year: 2018).*
Ahmed et al., "Distributed Large-scale Natural Graph Factorization*", International World Wide Web Conference Committee (IW3C2), 2013, pp. 1-11, Rio de Janeiro, Brazil.
Azar et al., "Biased Random Walks", Combinatorica, Apr. 1996, pp. 1-20.
Belkin et al., "Laplacian Eigenmaps and Spectral Techniques for Embedding and Clustering", Advances in Neural Information Processing Systems, 2001, pp. 1-7.
Bengio et al., "Representation Learning: A Review and New Perspectives", arXiv:1206.5538v3, 2014, pp. 1-30.
Benson et al., "Higher-order organization of complex networks", Science, Jul. 2016, pp. 163-166, vol. 353:6295.
Cao et al., "Deep Neural Networks for Learning Graph Representations", Proceedings of the Thirtieth AAAI Conference on Artificial Intelligence (AAAI-16), 2016, pp. 1145-1152.
Carletti et al., "Introducing VF3: A New Algorithm for Subgraph Isomorphism", LNCS, 2017, pp. 128-139, vol. 10310, Springer International Publishing AG.
Chang et al., "Heterogeneous Network Embedding via Deep Architectures", KDD '15: Proceedings of the 21th ACM SIGKDD International Conference on Knowledge Discovery and Data Mining, 2015, pp. 119-128, Sydney, Australia.
Chen et al., "HARP: Hierarchical Representation Learning for Networks", The Thirty-Second AAAI Conference on Artificial Intelligence (AAAI-18), 2018, pp. 2127-2134.
Dong et al., "metapath2vec: Scalable Representation Learning for Heterogeneous Networks", KDD '17: Proceedings of the 23rd ACM SIGKDD International Conference on Knowledge Discovery and Data Mining, Aug. 2017, pp. 135-144, Halifax, NS, Canada.
Goyal et al., "Graph Embedding Techniques, Applications, and Performance: A Survey", arXiv:1705.02801v4, Dec. 2017, pp. 1-19.
Goyal et al., "DynGEM: Deep Embedding Method for Dynamic Graphs", arXiv:1805.11273v1, May 2018, pp. 1-8.
Grover et al., "node2vec: Scalable Feature Learning for Networks", KDD '16: Proceedings of the 22nd ACM SIGKDD International Conference on Knowledge Discovery and Data Mining, Aug. 2016, pp. 1-10, San Francisco, CA, USA.
Hagberg et al., "Exploring Network Structure, Dynamics, and Function using NetworkX", Proceedings of the 7th Python in Science Conference (SciPy 2008), 2008, pp. 11-16. Retrieved from http://conference.scipy.org/proceedings/ SciPy2008/paper_2.
He et al., "Ups and Downs: Modeling the Visual Evolution of Fashion Trends with One-Class Collaborative Filtering", International World Wide Web Conference Committee (IW3C2), Apr. 2016, pp. 507-517, Montreal Quebec, Canada.
Juang et al., "Label Informed Attributed Network Embedding", WSDM, Feb. 2017, pp. 731-739, Cambridge, United Kingdom.
Jolliffe, "Principal Component Analysis", International Encyclopedia of Statistical Science, 2011, pp. 1094-1096.
Kavurucu, "A comparative study on network motif discovery algorithms", Int. J. Data Mining and Bioinformatics, 2015, pp. 180-204, vol. 11:2.
Kipf et al., "Semi-Supervised Classification with Graph Convolutional Networks", Published as a conference paper at CLR 2017, arXiv:1609.02907v4, 2017, pp. 1-14.
Kong et al., "Meta Path-Based Collective Classification in Heterogeneous Information Networks", CIKM '12: Proceedings of the 21st ACM International Conference on Information and Knowledge Management, 2012, pp. 1-5, Maui, HI, USA.
Kong et al., "Meta Path-Based Collective Classification in Heterogeneous Information Networks", arXiv:1305.4433v1, 2013, pp. 1-18.
Li et al., "Temporal Motifs in Heterogeneous Information Networks", Proc. MLG Workshop, 2018, pp. 1-7.
Martinez et al., "PCA versus LDA", IEEE Transactions on Pattern Analysis and Machine Intelligence, 2001, pp. 1-10, vol. 23:2.
McCallum et al., "Automating the Construction of Internet Portals with Machine Learning", 2000, pp. 1-46, Kluwer Academic Publishers.
Mikolov et al., "Efficient Estimation of Word Representations in Vector Space", arXiv:1301.3781v3, Sep. 2013, pp. 1-12.
Mikolov et al., "Distributed Representations of Words and Phrases and their Compositionality", Advances in Neural Information Processing Systems, 2013, pp. 1-9, vol. 26.
Nguyen et al., "Motif-Aware Graph Embeddings", Third International Workshop on Representation Learning for Graphs, 2017, pp. 1-7.
Nguyen et al., "Motif-aware method for graph analysis", 3rd ReLiG Workshop 2017, Tokyo Institute of Technology, 2017, pp. 1-74.
Ou et al., "Asymmetric Transitivity Preserving Graph Embedding", KDD '16: Proceedings of the 22nd ACM SIGKDD International Conference on Knowledge Discovery and Data Mining, Aug. 2016, pp. 1-10, San Francisco, CA, USA.
Perozzi et al., "DeepWalk: Online Learning of Social Representations", KDD '14: Proceedings of the 20th ACM SIGKDD International Conference on Knowledge Discovery and Data Mining, Aug. 2014, pp. 1-10, New York, NY, USA.
Perozzi et al., "Don't Walk, Skip! Online Learning of Multi-scale Network Embeddings", arXiv:1605.02115v2, Jun. 2017, pp. 1-8.
Pio et al., "Multi-Type Clustering and Classification from Heterogeneous Networks", Information Sciences, Jan. 2018, pp. 1-29.
Rehurek et al., "Software Framework for Topic Modelling with Large Corpora", Proceedings of LREC 2010 workshop New Challenges for NLP Frameworks, May 2010, pp. 46-50.
Rossi et al., "Higher-order Network Representation Learning", International World Wide Web Conference Committee, Apr. 2018, pp. 1-2, Lyon, France.
Roweis et al., "Nonlinear Dimensionality Reduction by Locally Linear Embedding", Science, Dec. 2000, pp. 2323-2326, vol. 290.
Sankar et al., "Motif-based Convolutional Neural Network on Graphs", arXiv:1711.05697v4, Jul. 2019, pp. 1-7.
Shen-Orr et al., "Network motifs in the transcriptional regulation network of *Escherichia coli*", Nature Genetics, May 2002, pp. 64-68, vol. 31.
Shi et al., "Relevance Search in Heterogeneous Networks", EDBT, Mar. 2012, pp. 1-12, Berlin, Germany.
Shi et al., "A Survey of Heterogeneous Information Network Analysis", IEEE Transactions on Knowledge and Data Engineering, arXiv:1511.04854v1, Nov. 2015, pp. 1-45.
Shi et al., "AspEm: Embedding Learning by Aspects in Heterogeneous Information Networks", arXiv:1803.01848v1, Mar. 2018, pp. 1-11.
Sun et al., "Mining Heterogeneous Information Networks", Synthesis Lectures on data Mining and Knowledge Discovery, 2022, pp. 1-208, Springer Nature Switzerland AG.

(56) References Cited

OTHER PUBLICATIONS

Sun et al., "When Will It Happen?—Relationship Prediction in Heterogeneous Information Networks", WSDM '12: Proceedings of the Fifth ACM International Conference on Web Search and Data Mining, Feb. 2012, pp. 1-10, Seattle, Washington, USA.

Sun et al., "PathSim: Meta Path-Based Top-K Similarity Search in Heterogeneous Information Networks", Proceedings of the VLDB Endowment, 2011, pp. 1-12, vol. 4:11, Seattle, Washington.

Sun et al., "Integrating Meta-Path Selection with User-Guided Object Clustering in Heterogeneous Information Networks", KDD'12, Aug. 2012, pp. 1-9, Beijing, China.

Sun et al., "Ranking-Based Clustering of Heterogeneous Information Networks with Star Network Schema", KDD'09, 2009, pp. 1-9, Paris, France.

Tang et al., "PTE: Predictive Text Embedding through Large-scale Heterogeneous Text Networks", KDD '15: Proceedings of the 21th ACM SIGKDD International Conference on Knowledge Discovery and Data Mining, arXiv:1508.00200v1, Aug. 2015, pp. 1-10, Sydney, NSW, Australia.

Tang et al., "LINE: Large-scale Information Network Embedding", arXiv:1503.03578v1, International World Wide Web Conference Committee, May 2015, pp. 1-11, Florence, Italy.

Tang et al., "Leveraging social media networks for classification", Data Min Knowl Disc, 2011, pp. 447-478, vol. 23.

Tenenbaum et al., "A Global Geometric Framework for Nonlinear Dimensionality Reduction", Science, Dec. 2000, pp. 2319-2323, vol. 290.

Tsourakakis, "Motif-Driven Graph Analysis", 54th Annual Allerton Conference on Communication, Control, and Computing (Allerton), 2016, pp. 1-3.

Tsourakakis, "Scalable Motif-aware Graph Clustering", International World Wide Web Conference Committee (IW3C2), Apr. 2017, pp. 1451-1460, Perth, Australia.

Van Vlasselaer et al., "APATE: A novel approach for automated credit card transaction fraud detection using network-based extensions", Decision Support Systems, 2015, pp. 38-48, vol. 75.

Wang et al., "Structural Deep Network Embedding", KDD '16: Proceedings of the 22nd ACM SIGKDD International Conference on Knowledge Discovery and Data Mining, Aug. 2016, pp. 1-10, San Francisco, CA, USA.

Wang et al., "Review Graph based Online Store Review Spammer Detection", 2011 IEEE 11th International Conference on Data Mining, 2011, pp. 1-6.

Wang et al., "Billion-scale Commodity Embedding for E-commerce Recommendation in Alibaba", arXiv:1803.02349v2, KDD'18, May 2018, pp. 1-10, London, United Kingdom.

Yin et al., "Higher-order clustering in networks", American Physical Scoiety, 2018, pp. 1-11, vol. 97.

Yin et al., "Local Higher-Order Graph Clustering", KDD '17: Proceedings of the 23rd ACM SIGKDD International Conference on Knowledge Discovery and Data Mining, Aug. 2017, pp. 555-564, Halifax, NS, Canada.

Zhang et al., "MetaGraph2Vec: Complex Semantic Path Augmented Heterogeneous Network Embedding", arXiv:1803.02533v1, Mar. 2018, pp. 1-12.

Zhang et al., "Explicit Factor Models for Explainable Recommendation based on Phrase-level Sentiment Analysis", SIGIR '14: Proceedings of the 37th International ACM SIGIR Conference on Research & Development in Information Retrieval, Jul. 2014, pp. 83-92, Gold Coast, Queensland, Australia.

Zhao et al., "Meta-Graph Based Recommendation Fusion over Heterogeneous Information Networks", KDD '17: Proceedings of the 23rd ACM SIGKDD International Conference on Knowledge Discovery and Data Mining, pp. 1-10, Halifax, Canada.

Zhu et al., "Scalable Temporal Latent Space Inference for Link Prediction in Dynamic Social Networks", arXiv:1411.3675v3, pp. 1-16.

* cited by examiner

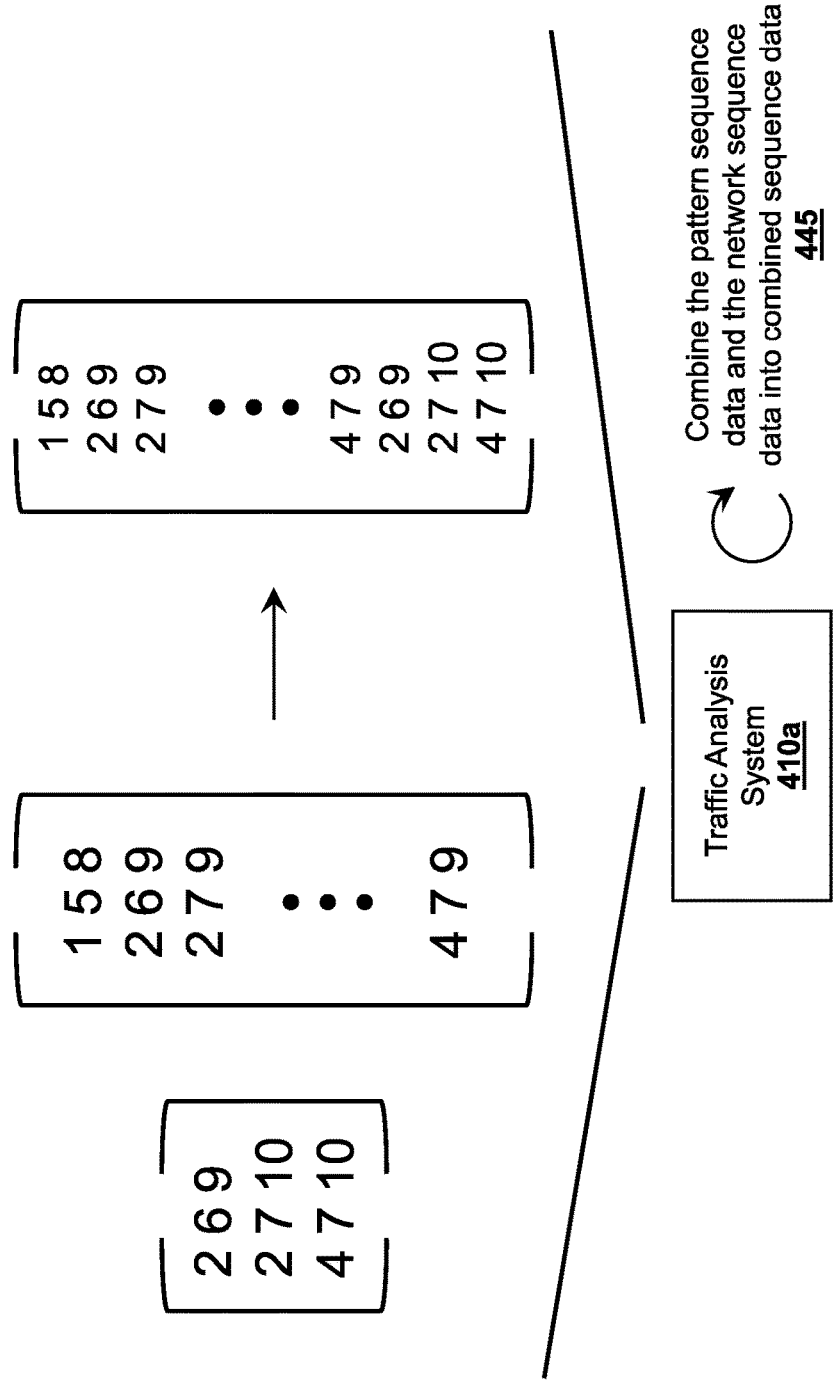

SYSTEM, METHOD, AND COMPUTER PROGRAM PRODUCT FOR GENERATING EMBEDDINGS FOR OBJECTS

CROSS-REFERENCE TO RELATED APPLICATIONS

This application is the United States national phase of International Application No. PCT/US2019/063953 filed Dec. 2, 2019 and claims priority to U.S. Patent Application No. 62/773,264, filed Nov. 30, 2018, which are incorporated by reference herein in their entirety.

BACKGROUND

1. Field

This disclosure relates generally to generating embeddings for objects and, in some non-limiting embodiments or aspects, to systems, methods, and computer program products for generating embeddings of objects in a heterogeneous network.

2. Technical Considerations

Graphs may include nodes representing objects associated with an object type and edges connecting the nodes (e.g., objects), and the edges may be associated with an edge type. Such graphs may be constructed to represent relationships between the nodes (e.g., objects) in each graph based on the edges connecting such nodes. For example, a homogeneous graph may be constructed to represent relationships between objects of the same type to each other. For the purpose of illustration, a homogeneous graph may be constructed to represent relationships between parties to payment transactions, and the homogeneous graph may include a node for each party (e.g., account holder, merchant, and/or the like) and an edge for each payment transaction between two of the parties (e.g., nodes). While homogeneous graphs may be adequate for representing simple relationships (e.g., between objects associated with a single object type and/or edges associated with a single edge type), these homogeneous graphs may be inadequate for representing relationships between objects associated with differing object types or edges associated with differing edge types.

Heterogeneous graphs may include nodes representing objects associated with one or more object types and edges connecting the nodes; and the edges may be associated with one or more edge types. Such heterogeneous graphs may be able to represent multiple relationships between objects in a graph. For example, a heterogeneous graph may represent objects associated with differing object types, and the relationship of the objects to one another may be represented by edges associated with differing edge types. For the purpose of illustration, a heterogeneous graph may be constructed to represent relationships between diverse entities (e.g., users, merchants, issuer institutions, acquirer institutions, and/or the like) in a payment transaction network.

However, analyzing the relationships between nodes in a heterogeneous graphs may be difficult. For example, applying certain techniques for analyzing relationships between objects in a homogeneous graph have been found to be insufficient for heterogeneous graphs. Additionally or alternatively, certain techniques for analyzing nodes (e.g., to extract information about relationships between such nodes, generate embeddings and/or vector representations of such nodes, and/or the like) in heterogeneous graphs may be limited due to lack of flexibility. For example, certain techniques for analyzing nodes in heterogeneous graphs may search for patterns that start and end with the same type of node (e.g., for guidance of path walking algorithms). Such techniques may thus be inadequate for identifying meaningful paths involving nodes of other types and/or be inadequate to generate meaningful data regarding an entire heterogeneous graph including nodes of multiple types. Additionally or alternatively, representations of relationships between nodes that are extracted by certain techniques for analyzing heterogeneous graphs may suffer from under-sampling and/or failure to sample portions of the graph (e.g., nodes that could be used to provide meaningful information regarding such relationships). Additionally, information derived from these representations of relationships (e.g., embeddings purportedly representing relationships between such objects) may be limited in the level of accuracy that may be obtained by virtue of the under-sampling and/or exclusion of such portions (e.g., nodes) when generating inputs for generation of such embeddings. Additionally or alternatively, certain techniques for analyzing heterogeneous graphs may be limited to searching for a single pattern or single subgraph at a time, further limiting the amount of meaningful patterns that may be identified in the graph.

SUMMARY

Accordingly, disclosed are systems, methods, and computer program products for generating embeddings for objects.

According to some non-limiting embodiments or aspects, provided is a computer-implemented method for generating embeddings for objects. The computer-implemented method may include receiving heterogeneous network data associated with a plurality of objects in a heterogeneous network. At least one pattern of objects may be selected. Instances of each pattern of objects may be determined based on the heterogeneous network data. A pattern matrix for each pattern of objects may be generated based on the instances of the pattern of objects. Pattern sequence data associated with a portion of each pattern matrix may be generated. Network sequence data associated with a portion of the heterogeneous network data may be generated. The pattern sequence data and the network sequence data may be combined into combined sequence data. A vector for each object of the plurality of objects may be generated based on the combined sequence data.

According to some non-limiting embodiments or aspects, provided is a system for generating embeddings for objects. The system may include at least one processor programmed and/or configured to receive heterogeneous network data associated with a plurality of objects in a heterogeneous network. At least one pattern of objects included in the heterogeneous network may be determined to have a frequency of occurrence that is statistically significant. At least one pattern of objects may be selected based on determining that the at least one pattern of objects has a frequency of occurrence that is statistically significant. Instances of each pattern of objects may be determined based on the heterogeneous network data, A pattern matrix for each pattern of objects may be generated based on the instances of the pattern of objects. Pattern sequence data associated with a portion of each pattern matrix may be generated. Network sequence data associated with a portion of the heterogeneous network data may be generated. The pattern sequence data and the network sequence data may be combined into combined sequence data. A vector for each object of the plurality of objects may be generated based on the combined sequence data.

According to some non-limiting embodiments or aspects, provided is a computer program product for generating embeddings for objects. The computer program product may include at least one non-transitory computer-readable medium, which may include one or more instructions that, when executed by at least one processor, cause the at least one processor to receive heterogeneous network data associated with a plurality of objects in a heterogeneous network. At least one pattern of objects included in the heterogeneous network may be determined to have a frequency of occurrence that is statistically significant. At least one pattern of objects may be selected based on determining that the at least one pattern of objects has a frequency of occurrence that is statistically significant, Instances of each pattern of objects may be determined based on the heterogeneous network data. A pattern matrix for each pattern of objects may be generated based on the instances of the pattern of objects. Pattern sequence data associated with a portion of each pattern matrix may be generated. Network sequence data associated with a portion of the heterogeneous network data may be generated. The pattern sequence data and the network sequence data may be combined into combined sequence data. A vector for each object of the plurality of objects may be generated based on the combined sequence data.

Further non-limiting embodiments or aspects are set forth in the following numbered clauses:

Clause 1: A method for generating embeddings of objects in a heterogeneous network, comprising: receiving, with at least one processor, heterogeneous network data associated with a plurality of objects in a heterogeneous network; selecting, with at least one processor, at least one pattern of objects; determining, with at least one processor, instances of each pattern of objects based on the heterogeneous network data; generating, with at least one processor, a pattern matrix for each pattern of objects based on the instances of the pattern of objects; generating, with at least one processor, pattern sequence data associated with a portion of each pattern matrix; generating, with at least one processor, network sequence data associated with a portion of the heterogeneous network data; combining, with at least one processor, the pattern sequence data and the network sequence data into combined sequence data; and generating, with at least one processor, a vector for each object of the plurality of objects based on the combined sequence data.

Clause 2: The method of clause 1, wherein the plurality of objects comprises a plurality of nodes, each node of the plurality of nodes connected to at least one other node of the plurality of nodes by an edge.

Clause 3: The method of clauses 1 or 2, wherein each edge is directional.

Clause 4: The method of any of clauses 1-3, wherein each node comprises a node type, and wherein the node type comprises at least one of the following: a cardholder, an amount, a merchant, a merchant category code, a location, a transaction channel, a restaurant, a meal type, a city, or any combination thereof.

Clause 5: The method of any of clauses 1-4, wherein each edge comprises an edge type, the edge type comprising at least one of the following: spend, pay via, at, belongs to, pay to, located in, visit, eat, or any combination thereof.

Clause 6: The method of any of clauses 1-5, wherein selecting the at least one pattern of objects comprises determining, with at least one processor, the at least one pattern of objects has a frequency of occurrence that is statistically significant based on the heterogeneous network data.

Clause 7: The method of any of clauses 1-6, wherein determining the at least one pattern of objects has the frequency of occurrence that is statistically significant comprises: extracting, with at least one processor, the instances of the at least one pattern from the heterogeneous network data using graph submatching; determining, with at least one processor, the frequency of occurrence of the at least one pattern of objects based on the instances of the at least one pattern of objects; and determining, with at least one processor, the frequency of occurrence of the at least one pattern of objects is statistically significant.

Clause 8: The method of any of clauses 1-7, wherein each pattern of objects comprises a motif, and wherein each pattern matrix comprises a motif adjacency matrix, and wherein generating a pattern matrix for each pattern of objects comprises: creating, with at least one processor, a matrix for each respective motif, each row of the matrix associated with a first respective object of the plurality of objects in the heterogeneous network and each column the matrix associated with a second respective object of the plurality of objects in the heterogeneous network; determining, with at least one processor, weights for the matrix, each weight comprising a number of the instances of the motif that includes the first respective object associated with a respective row of the matrix and the second respective object associated with a respective column of the matrix; and storing, with at least one processor, the matrix as the motif adjacency matrix associated with the respective motif.

Clause 9: The method of any of clauses 1-8, wherein the portion of each pattern matrix comprises a random walk sample of the pattern matrix; and wherein the portion of the heterogeneous network data comprises a random walk sample of the heterogeneous network data.

Clause 10: The method of any of clauses 1-9, wherein generating the vector for each object of the plurality of objects comprises: inputting, with at least one processor, the combined sequence data into a predictive model; and determining, with at least one processor, the vector for each object of the plurality of objects based on the output of the predictive model.

Clause 11: The method of any of clauses 1-10, wherein the predictive model comprises at least one of a neural network or a skip-gram model.

Clause 12: A system for generating embeddings of objects in a heterogeneous network, the system comprising: at least one processor programmed or configured to: receive heterogeneous network data associated with a plurality of objects in a heterogeneous network; determine that at least one pattern of objects included in the heterogeneous network has a frequency of occurrence that is statistically significant; select at least one pattern of objects based on determining that the at least one pattern of objects has a frequency of occurrence that is statistically significant; determine instances of each pattern of objects based on the heterogeneous network data; generate a pattern matrix for each pattern of objects based on the instances of the pattern of objects; generate pattern sequence data associated with a portion of each pattern matrix; generate network sequence data associated with a portion of the heterogeneous network data; combine the pattern sequence data and the network sequence data into combined sequence data; and generate a vector for each object of the plurality of objects based on the combined sequence data.

Clause 13: The system of clause 12, wherein the plurality of objects comprises a plurality of nodes, each node of the plurality of nodes connected to at least one other node of the plurality of nodes by an edge Clause 14: The system of clauses 12 or 13, wherein when determining the at least one pattern of objects included in the heterogeneous network has the frequency of occurrence that is statistically significant, the at least one processor is programmed or configured to: extract the instances of the at least one pattern from the heterogeneous network data using graph submatching; determine the frequency of occurrence of the at least one pattern of objects based on the instances of the at least one pattern of objects; and determine the frequency of occurrence of the at least one pattern of objects is statistically significant.

Clause 15: The system of any of clauses 12-14, wherein each pattern of objects comprises a motif, and wherein each pattern matrix comprises a motif adjacency matrix, and wherein, when generating a pattern matrix for each pattern of objects, the at least one processor is programmed or configured to: create a matrix for each respective motif, each row of the matrix associated with a first respective object of the plurality of objects in the heterogeneous network and each column the matrix associated with a second respective object of the plurality of objects in the heterogeneous network; determine weights for the matrix, each weight comprising a number of the instances of the motif that includes the first respective object associated with a respective row of the matrix and the second respective object associated with a respective column of the matrix; and store the matrix as the motif adjacency matrix associated with the respective motif.

Clause 16: A computer program product for generating embeddings of objects in a heterogeneous network, comprising at least one non-transitory computer-readable medium comprising one or more instructions that, when executed by at least one processor, cause the at least one processor to: receive heterogeneous network data associated with a plurality of objects in a heterogeneous network; determine that at least one pattern of objects included in the heterogeneous network has a frequency of occurrence that is statistically significant; select at least one pattern of objects based on determining that the at least one pattern of objects has a frequency of occurrence that is statistically significant; determine instances of each pattern of objects based on the heterogeneous network data; generate a pattern matrix for each pattern of objects based on the instances of the pattern of objects; generate pattern sequence data associated with a portion of each pattern matrix; generate network sequence data associated with a portion of the heterogeneous network data; combine the pattern sequence data and the network sequence data into combined sequence data; and generate a vector for each object of the plurality of objects based on the combined sequence data.

Clause 17: The computer program product of clause 16, wherein the plurality of objects comprises a plurality of nodes, each node of the plurality of nodes connected to at least one other node of the plurality of nodes by an edge.

Clause 18: The computer program product of clauses 16 or 17, wherein the one or more instructions that cause the at least one processor to determine that the at least one pattern of objects included in the heterogeneous network has the frequency of occurrence that is statistically significant cause the at least one processor to: extract the instances of the at least one pattern from the heterogeneous network data using graph submatching; determine the frequency of occurrence of the at least one pattern of objects based on the instances of the at least one pattern of objects; and determine the frequency of occurrence of the at least one pattern of objects is statistically significant.

Clause 19: The computer program product of any of clauses 16-18, wherein each pattern of objects comprises a motif, and wherein each pattern matrix comprises a motif adjacency matrix, and wherein, when generating a pattern matrix for each pattern of objects, wherein the one or more instructions further cause the at least one processor to: create a matrix for each respective motif, each row of the matrix associated with a first respective object of the plurality of objects in the heterogeneous network and each column the matrix associated with a second respective object of the plurality of objects in the heterogeneous network; determine weights for the matrix, each weight comprising a number of the instances of the motif that includes the first respective object associated with a respective row of the matrix and the second respective object associated with a respective column of the matrix; and store the matrix as the motif adjacency matrix associated with the respective motif.

Clause 20: The computer program product of any of clauses 16-19, wherein the one or more instructions that cause the at least one processor to generate the vector for each object of the plurality of objects cause the at least one processor to: input the combined sequence data into a predictive model; and determine the vector for each object of the plurality of objects based on the output of the predictive model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4G are diagrams of an implementation of non-limiting aspects or embodiments of a process for generating embeddings for objects;

DESCRIPTION

Figure 1:
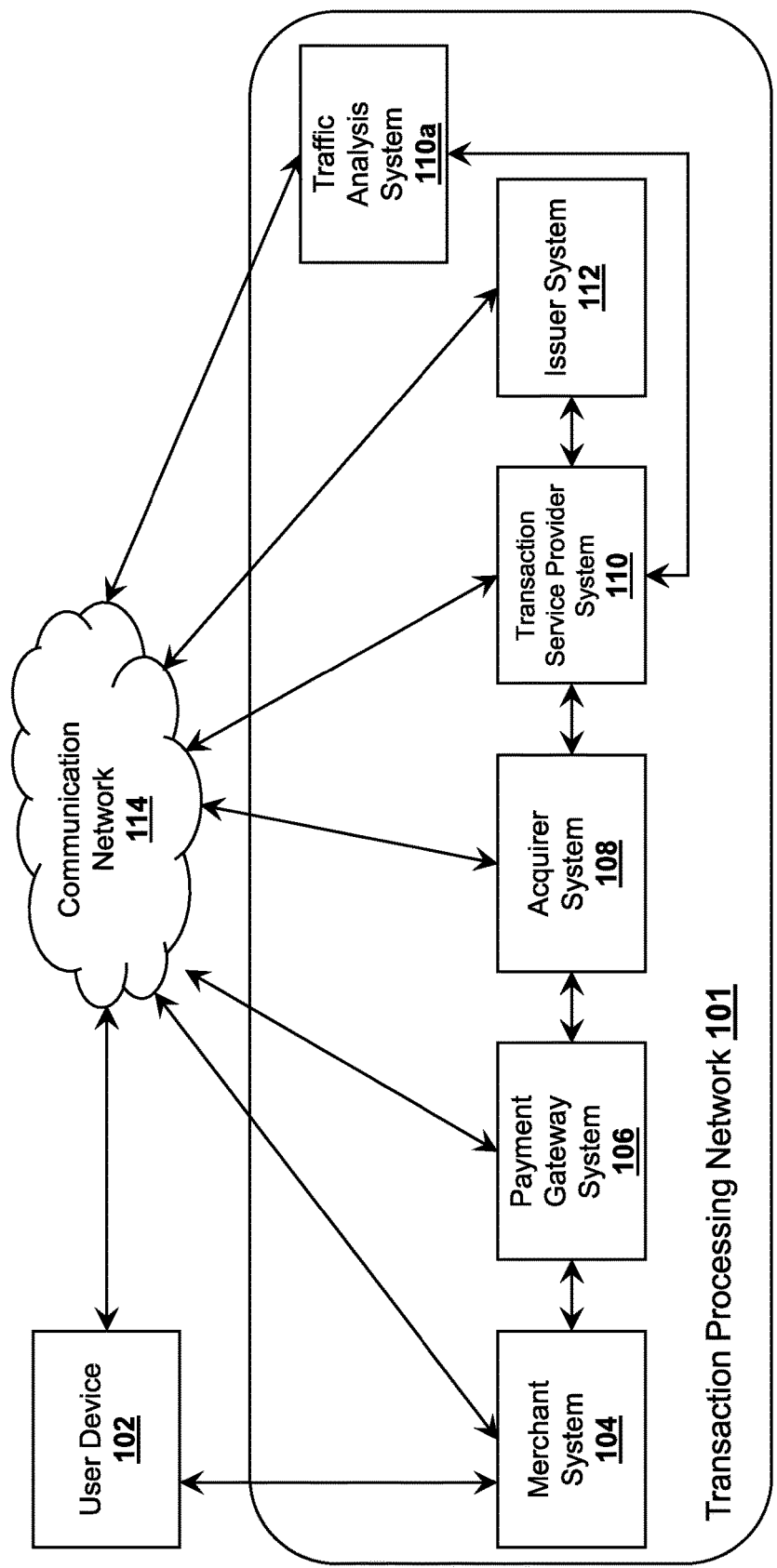
FIG. 1 is a diagram of non-limiting aspects or embodiments of a system for generating embeddings for objects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, a "POS system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a portable payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices directly or indirectly communicating in the network environment may constitute a "system" or a "computing system."

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for generating embeddings for objects. In some non-limiting embodiments or aspects, systems, methods, and computer program products may include and/or implement selecting at least one pattern of objects, generating a pattern matrix for each pattern of objects based on the instances of the pattern of objects, and generating pattern sequence data and network sequence data, which may be combined to into combined sequence data that may be used to generate a vector for each object. By virtue of implementation of systems, methods, and computer program products described herein, techniques for analyzing heterogeneous graphs may enable analyzing such graphs without limiting the number of objects that may be analyzed (e.g., at a time) and/or without limiting the number of types of objects being analyzed (e.g., at a time). Additionally, the disclosed techniques for analyzing heterogeneous graphs may not require that patterns of objects used in such analysis include an initial object that has the same type as the final object in the pattern. Additionally, representations of objects (e.g., embeddings) derived using the techniques disclosed herein may have improved (e.g., increased, enhanced, and/or the like) accuracy since portions of (e.g., nodes and/or objects in) the graph associated with meaningful (e.g., statistically significant) patterns may be sampled (e.g., included at an increased rate, included an increased number of times, included with increased frequency, and/or the like) in sequences so that representations (e.g., embeddings) generated based on such sequences accurately capture and/or reflect such meaning. Additionally or alternatively, the disclosed techniques for analyzing heterogeneous graphs may allow for selecting multiple patterns (e.g., motifs) at a time, further (e.g., increasing and/or the like) the amount of meaningful patterns that may be identified in the graph.

In some examples, by virtue of the increased number of node types and configurations that may be included in a graph, and by extension the semantic structure and represented relationships represented by the graph, the accuracy of the classification of each node (e.g., the accuracy of embeddings generated based on a predictive model and the graph) may also be increased. This is attributable, in part, to the flexible analysis afforded by the methods described herein that allow for sampling of all nodes in a graph as well as focusing sampling to identify nodes that are statistically significant (e.g., nodes included in patterns of nodes that are identified as statistically significant). For example, methods of analyzing the relationships between nodes as described herein may not limit the nodes that can be identified in the way that certain techniques of analyzing homogeneous graphs are, as described above. As a result, the flexible analysis provided by the methods described herein may allow for the extraction of representations of relationships that based on fully-sampled graphs. Information derived from these relationships (e.g., embeddings representing relationships between such objects), in turn, may also be more accurate by virtue of the inclusion of these nodes that would have been excluded using certain methods for analyzing homogeneous graphs, described above.

Referring now to FIG. 1, FIG. 1 is a diagram of an example environment 100 in which devices, systems, methods, and/or products described herein may be implemented. As shown in FIG. 1, environment 100 includes transaction processing network 101, user device 102, merchant system 104, payment gateway system 106, acquirer system 108, transaction service provider system 110, traffic analysis system 110a, and/or issuer system 112. Transaction processing network 101, user device 102, merchant system 104, payment gateway system 106, acquirer system 108, transaction service provider system 110, traffic analysis system 110a, and/or issuer system 112 may interconnect (e.g., establish a connection to communicate, and/or the like) via wired connections, wireless connections, or a combination of wired and wireless connections.

User device 102 may include a computing device configured to be in communication with merchant system 104, payment gateway system 106, acquirer system 108, transaction service provider system 110, traffic analysis system 110a, and/or issuer system 112 via communication network 114 and/or other networks. For example, user device 102 may include a computing device such as, for example, a client device and/or the like. User device 102 may be configured to transmit and/or receive data to and/or from merchant system 104 via an imaging system and/or a short-range wireless communication connection (e.g., an NFC communication connection, an RFID communication connection, a Bluetooth® communication connection, and/or the like). In some non-limiting embodiments or aspects, user device 102 may be associated with a user (e.g., an individual operating a device). In some non-limiting embodiments or aspects, user device 102 may include an application associated with user device 102 (e.g., an application stored on user device 102 such as a mobile device application, a native application for a mobile device, a mobile cloud application for a mobile device, an electronic wallet application, a peer-to-peer payment transfer application, and/or the like).

Merchant system 104 may include a computing device configured to be in communication with user device 102, payment gateway system 106, acquirer system 108, transaction service provider system 110, traffic analysis system 110*a,* and/or issuer system 112 via communication network 114 and/or other networks. For example, merchant system 104 may include one or more computing devices configured to transmit and/or receive data to and/or from user device 102, payment gateway system 106, acquirer system 108, transaction service provider system 110, traffic analysis system 110*a,* and/or issuer system 112 via communication network 114 and/or other networks, such as a server, a group of servers, a client device, a group of client devices, and/or other like devices. In some non-limiting embodiments or aspects, merchant system 104 may include a point-of-sale (POS) device. In some non-limiting embodiments or aspects, merchant system 104 may be associated with a merchant as described herein. In some non-limiting embodiments or aspects, merchant system 104 may include an application associated with merchant system 104 (e.g., an application stored on merchant system 104 such as an application, a native application, a cloud application, a mobile device application, a native application for a mobile device, a mobile cloud application for a mobile device, an electronic wallet application, a peer-to-peer payment transfer application, and/or the like).

Payment gateway system 106 may include one or more computing devices configured to be in communication with user device 102, merchant system 104, acquirer system 108, transaction service provider system 110, traffic analysis system 110*a,* and/or issuer system 112 via communication network 114 and/or other networks. For example, payment gateway system 106 may include a server, a group of servers, and/or other like devices. In some non-limiting embodiments or aspects, payment gateway system 106 may be associated with a payment gateway as described herein.

Acquirer system 108 may include one or more computing devices configured to be in communication with user device 102, merchant system 104, payment gateway system 106, transaction service provider system 110, traffic analysis system 110*a,* and/or issuer system 112 via communication network 114 and/or other networks. For example, acquirer system 108 may include a server, a group of servers, and/or other like devices. In some non-limiting embodiments or aspects, acquirer system 108 may be associated with an acquirer as described herein.

Transaction service provider system 110 may include one or more computing devices configured to be in communication with user device 102, merchant system 104, payment gateway system 106, acquirer system 108, traffic analysis system 110*a,* and/or issuer system 112 via communication network 114. For example, transaction service provider system 110 may include a server (e.g., a transaction processing server), a group of servers, and/or other like devices. In some non-limiting embodiments or aspects, transaction service provider system 110 may be associated with a transaction service provider as described herein. In some non-limiting embodiments or aspects, transaction service provider system 110 may include traffic analysis system 110*a.*

Traffic analysis system 110*a* may include one or more computing devices configured to be in communication with user device 102, merchant system 104, payment gateway system 106, transaction service provider system 110, and/or issuer system 112 via communication network 114. For example, traffic analysis system 110*a* may include a server, a group of servers, and/or other like devices. In some non-limiting embodiments or aspects, traffic analysis system 110*a* may be associated with a transaction service provider as described herein. Additionally or alternatively, traffic analysis system 110*a* may be associated with a merchant, a payment gateway, an acquirer institution, an issuer institution, and/or the like, as described herein.

Issuer system 112 may include one or more computing devices configured to be in communication with user device 102, merchant system 104, payment gateway system 106, acquirer system 108, transaction service provider system 110, and/or traffic analysis system 110*a* via communication network 114 and/or other networks. For example, issuer system 112 may include a server, a group of servers, and/or other like devices. In some non-limiting embodiments or aspects, issuer system 112 may be associated with an issuer institution that issued a payment account and/or instrument (e.g., a credit account, a debit account, a credit card, a debit card, and/or the like) to a user (e.g., a user associated with user device 102 and/or the like).

In some non-limiting embodiments or aspects, transaction processing network 101 includes a plurality of systems in a communication path for processing a transaction. For example, transaction processing network 101 may include merchant system 104, payment gateway system 106, acquirer system 108, transaction service provider system 110, and/or issuer system 112 in a communication path (e.g., a communication path, a communication channel, a communication network, and/or the like). As an example, transaction processing network 101 may process (e.g., initiate, conduct, authorize, and/or the like) an electronic payment transaction via the communication path between merchant system 104, payment gateway system 106, acquirer system 108, transaction service provider system 110, and/or issuer system 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
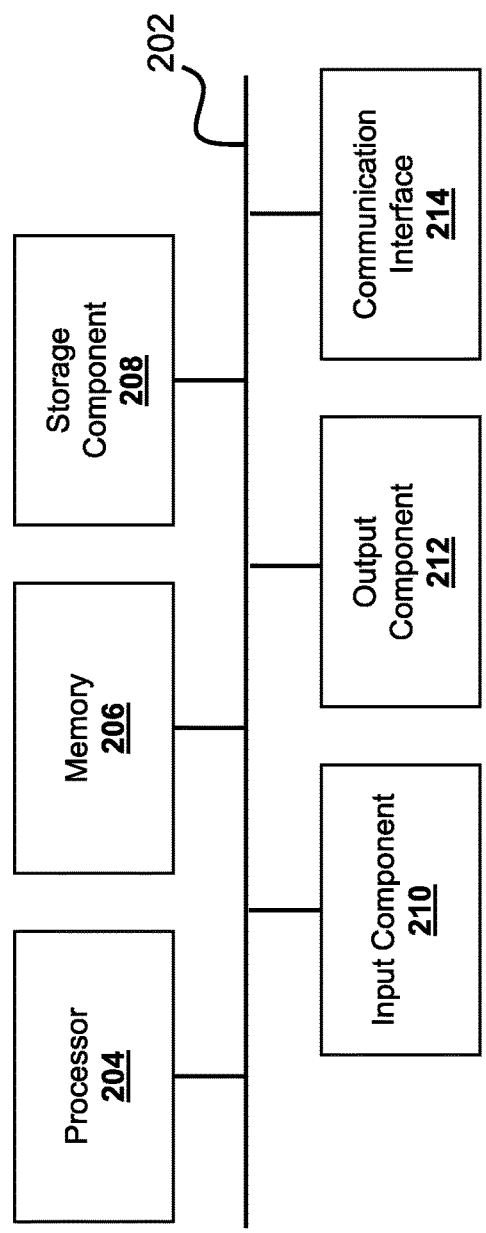
FIG. 2 is a diagram of non-limiting aspects or embodiments of components of one or more devices and/or one or more systems of FIG. 1.

Referring now to FIG. 2, illustrated is a diagram of example components of device 200. Device 200 may correspond to one or more devices of transaction processing network 101, one or more devices of user device 102 (e.g., one or more devices of a system of user device 102), one or more devices of merchant system 104, one or more devices of the payment gateway system 106, one or more devices of acquirer system 108, one or more devices of transaction service provider system 110, one or more devices of the issuer system 112, and/or one or more devices of the communication network 114. In some non-limiting embodiments or aspects, one or more devices of user device 102, one or more devices of merchant system 104, one or more devices of payment gateway system 106, one or more devices of acquirer system 108, one or more devices of transaction service provider system 110, one or more devices of issuer system 112, and/or one or more devices of the communication network 114 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include heterogeneous network data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
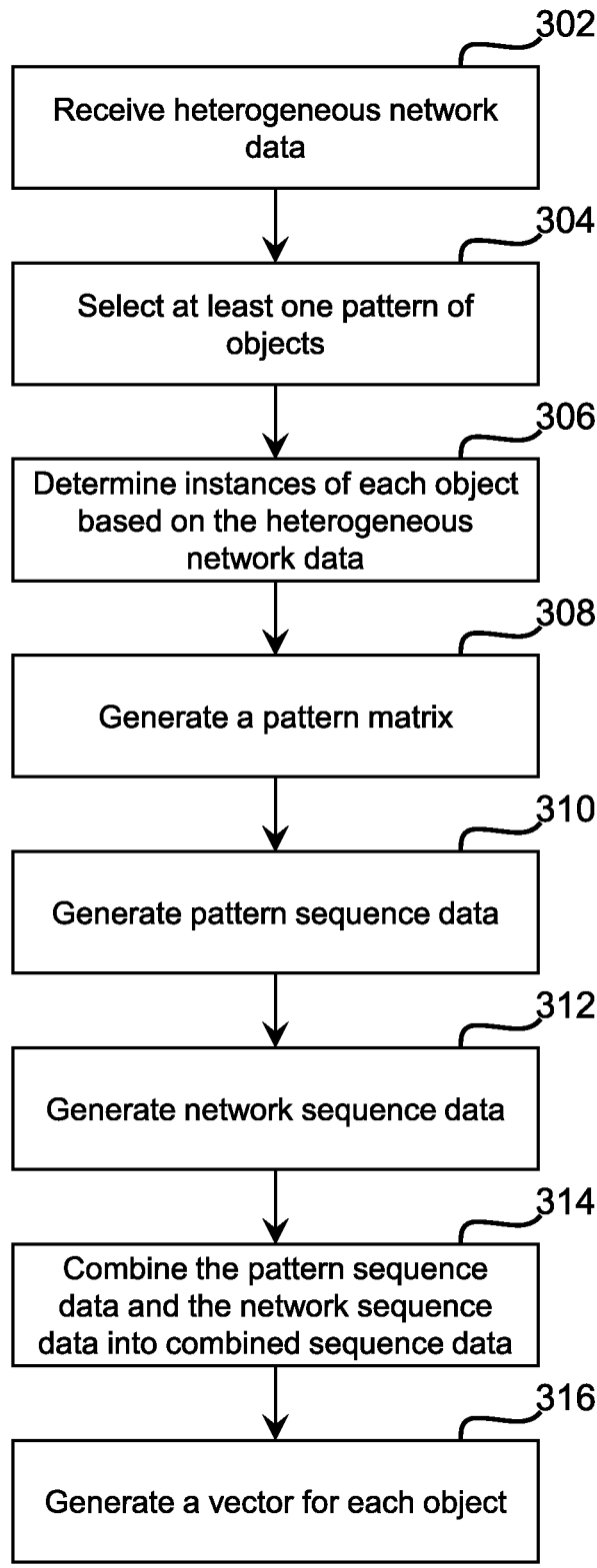
FIG. 3 is a flowchart of non-limiting aspects or embodiments of a process for generating embeddings for objects.

Referring now to FIG. 3, illustrated is a flowchart of non-limiting embodiments or aspects of a process 300 for generating embeddings for objects. In some non-limiting embodiments or aspects, one or more of the functions described with respect to process 300 may be performed (e.g., completely, partially, etc.) by traffic analysis system 110a. In some non-limiting embodiments or aspects, one or more of the steps of process 300 may be performed (e.g., completely, partially, and/or the like) by another device or a group of devices separate from and/or including traffic analysis system 110a, such as user device 102, merchant system 104, payment gateway system 106, acquirer system 108, transaction service provider system 110, and/or issuer system 112.

As shown in FIG. 3, at step 302, process 300 may include receiving heterogeneous network data. For example, traffic analysis system 110a may receive the heterogeneous network data. In some examples, traffic analysis system 110a may receive heterogeneous network data associated with a plurality of objects in a heterogeneous network (e.g., a heterogeneous information network). The plurality of objects may comprise a plurality of nodes, where the plurality of nodes are connected to one or more other nodes via an edge of a plurality of edges. In some non-limiting embodiments or aspects, each of the plurality of edges may be directional (e.g., uni-directional, bi-directional, and/or the like). For example, a first node may connect to a second node directionally via a uni-directional edge (e.g., via an edge that goes from the first node to the second node, but not back to the first node from the second node). In another example, the first node may connect to the second node directionally via a bi-directional edge (e.g., via an edge that goes from the first node to the second node and from the second node back to the first node).

In some non-limiting embodiments or aspects, the heterogeneous network may be represented as a graph (e.g., a directed graph). For example, the heterogeneous network may be represented as a graph (e.g., directed graph $G=(V, E, T_V, T_E)$) in which each node $v \in V$ is associated with mapping function $\varphi(v): V \to T_V$ and each edge (e.g., link) $e \in E$ is associated with mapping function $\varphi(v): E \to T_E$. $T_V$ and $T_E$ may denote the sets of node types and edge types, respectively, in G. Additionally or alternatively, $|T_V|$ may be greater than one 1 and/or $|T_E|$ may be greater than 1. Exemplary heterogeneous networks may include Digital Bibliography & Library Project (DBLP) bibliographic network, Yelp® social information network, social media networks (e.g., Facebook® and/or the like), electronic payment networks, and/or the like. In some non-limiting embodiments or aspects, multiple types of objects may be connected via multiple types of relationships. For the purpose of illustration, in DBLP, multiple types of objects such as authors, papers, conference venues, author organizations, and paper keywords may be connected via multiple types of relationships (e.g., connections of nodes represented by edges to other nodes) such as authorship (from a node associated with an author to a node associated with a paper via an edge), affiliation (from a node associated with an author to a node associated with an organization via an edge), and/or the like. In some non-limiting embodiments or aspects, multiple types of objects such as nodes associated with users, businesses, business locations, user reviews, review terms, and/or the like may be connected by multiple types of relationships such as check-in (e.g., from a node associated with a user to a node associated with a business via an edge), authorship (e.g., from a node associated with a user to a node associated with a review via an edge), and/or the like. In some non-limiting embodiments or aspects, objects may be associated with types such as a type associated with a cardholder, an amount (e.g., an amount for a payment transaction), a merchant (e.g., a car dealer, a clothing merchant, and/or the like), merchant category code (e.g., a code assigned to a merchant based on the goods and/or services the merchant transacts in), a location (e.g., an area, a country, a state, geographic coordinates, and/or the like), a transaction channel, a restaurant (e.g., a specific restaurant such as a local restaurant, a chain restaurant, and/or the like), a meal type (e.g., breakfast, lunch, dinner, dessert, and/or the like), and/or a city (e.g., New York, London, Paris, and/or the like). In some non-limiting embodiments or aspects, edges may be associated with types such as spend (e.g., a transaction amount that is spent per transaction, spent per period of time, and/or the like), pay via (e.g., one or more sequences of transmissions through a transaction processing network, and/or the like), belongs to (e.g., an identifier associated with a user for which a payment account and/or payment device belongs to, and/or the like), located in (e.g., a location associated with a payment transaction such as a location where the payment transaction was initiated, a location of one or more individuals (e.g., users, merchants, and/or the like) involved in the payment transaction, and/or the like), visit (e.g., an amount of times a merchant is visited by a user within a period of time, and/or the like), and/or eat (e.g., whether the transaction involves food preparation and/or delivery services, and/or the like), and/or the like.

In some non-limiting embodiments or aspects, given a heterogeneous network G, the goal of representation learning may be to learn a function $f: V \to R^d$ that maps nodes in G to d-dimensional features in vector space and learns $X \in R^{|V| \times d}$, $d \ll |V|$ such that network structural and semantic heterogeneity is preserved. In some non-limiting embodiments or aspects, a pattern of objects (e.g., motifs such as network motifs) $M=(V_M, E_M, T_{VM}, T_{EM})$ may be isomorphic induced directed subgraphs consisting of a subset of k nodes from a directed heterogeneous network G with $V_M \in V$, $E_M \in E$, $T_{VM} \in T_V$, and $T_{EM} \in T_E$, such that: $|V_M|=k$. Additionally or alternatively, $E_M$ may include all of the edges in E that have both endpoints in $V_M$. Additionally or alternatively, $(u, v) \in E_M$ may be satisfied if $(f(u),f(v)) \in E$ for mapping function $g: V_M \to V$. Additionally or alternatively, frequency $F_{Mk}$ of appearance of M in G may satisfy (e.g., be above) a pre-defined threshold associated with statistical significance. In some non-limiting embodiments or aspects, statistical significance may be determined based on an amount of instances of a pattern of objects within one or more heterogeneous networks. For example, a recurring pattern may be considered statistically significant if the frequency of the recurring pattern's appearance in a graph associated with a heterogeneous network is greater than the frequency of its appearance in one or more randomized networks (e.g., one or more randomized heterogeneous networks).

As shown in FIG. 3, at step 304, process 300 may include selecting at least one pattern of objects. For example, traffic analysis system 110a may select at least one pattern of objects (e.g., motif) from among a plurality of patterns of objects (e.g., a subset of patterns of objects included in all possible patterns of objects, a subset of a patterns of objects included in a set of patterns of objects, and/or the like). In some non-limiting embodiments or aspects, traffic analysis system 110a may select the at least one pattern of objects based on (e.g., in response to, after, and/or the like) receiving heterogeneous network data. In some non-limiting embodiments or aspects, patterns of objects may be used to understand complex networks. For example, patterns of objects may be identified when performing network mining tasks such as clustering, anomaly detection (e.g., densest subgraph sparsifiers), convolution, and/or the like. Examples of patterns of objects that include three nodes, four nodes, and five nodes are described and illustrated herein with respect to FIG. 5, FIG. 6, and FIG. 7, respectively.

As shown in FIG. 3, at step 306, process 300 may include determining instances of each pattern of objects based on the heterogeneous network data. For example, traffic analysis system 110a may determine instances of each pattern of objects, where the pattern of objects is identified based on the nodes and the edges connecting the nodes included in the heterogeneous network associated with the heterogeneous network data. In some non-limiting embodiments or aspects, each instance of each pattern of objects may be represented by subgraphs (e.g., subgraphs including some and/or all of the nodes of a heterogeneous network that are connected by some and/or all of the edges in the heterogeneous network) associated with each pattern of objects. For example, each instance of each pattern of objects may be represented by subgraphs that are associated with each pattern of objects. In some non-limiting embodiments or aspects, traffic analysis system 110a may determine that a pattern of objects is not an instance (e.g., not included in the heterogeneous network) based on traffic analysis system 110a determining that the subgraph associated with the pattern of objects is not an isomorphic subgraph included in the original graph (e.g., that the nodes and edges connecting the nodes included in the heterogeneous network data do not match the nodes and edges connecting the nodes included in the selected pattern of objects). For example, traffic analysis system 110a may determine that the subgraph associated with the pattern of objects is not isomorphic to the original graph based on traffic analysis system 110a determining that a bi-directional edge in the subgraph corresponds to a uni-directional edge in the pattern of objects, and/or the like.

In some non-limiting embodiments or aspects, traffic analysis system 110a may determine that the at least one pattern of objects is associated with a frequency of occurrence. For example, traffic analysis system 110a may determine that the at least one pattern of objects is associated with a frequency of occurrence indicating that the at least one pattern of objects is statistically significant. In some non-limiting embodiments or aspects, traffic analysis system 110a may determine that the at least one pattern of objects is associated with a frequency of occurrence that is statistically significant based on the heterogeneous network data. For example, traffic analysis system 110a may extract instances of the at least one pattern of objects from the heterogeneous network data. In some examples, traffic analysis system 110a may then determine the frequency of occurrence of the at least one pattern of objects based on the instances of the at least one pattern of objects. Traffic analysis system 110a may determine that the frequency of occurrence of the at least one pattern of objects is statistically significant based on the instance(s) of the at least one pattern of objects.

As shown in FIG. 3, at step 308, process 300 may include generating a pattern matrix. For example, traffic analysis system 110a may generate a pattern matrix for each pattern of objects (e.g., each pattern of objects selected by traffic analysis system 110a). In some examples, traffic analysis system 110a may generate the pattern matrix for each pattern of objects based on the instances of the pattern of objects (e.g., instances of the pattern of objects in the heterogeneous network). As described herein, the patterns of objects may be associated with (e.g., may include, comprise, consist of, and/or the like), a motif. The pattern matrix may include a motif adjacency matrix, as described herein. In some non-limiting embodiments or aspects, traffic analysis system 110a may create a matrix for each respective motif. For example, traffic analysis system 110a may create a matrix for a respective motif, where each row of the matrix is associated with a first respective object of the plurality of objects in the heterogeneous network, and where each column of the matrix is associated with a second respective object of the plurality of objects in the heterogeneous network.

In some non-limiting embodiments or aspects, traffic analysis system 110a may determine weights for the matrix. For example, traffic analysis system 110a may determine weights for the matrix where each weight comprises a number of instances of the motif associated with (e.g., including) the first respective object associated with a respective row of the matrix and the second respective object associated with a respective column of the matrix. Traffic analysis system 110a may then store the matrix as a motif adjacency matrix associated with the respective motif.

As shown in FIG. 3, at step 310, process 300 may include generating pattern sequence data. For example, traffic analysis system 110a may generate the pattern sequence data, where the pattern sequence data is associated with a portion of a pattern matrix and/or a portion of the graph (e.g., subgraph) associated with the nodes associated with the pattern matrix. In some examples, traffic analysis system 110a may generate the pattern sequence data based on traffic analysis system 110a determining a random walk sample of the pattern matrix and/or a portion of the graph (e.g., subgraph) associated with the nodes associated with the pattern matrix. For example, traffic analysis system 110a may determine the random walk sample of the pattern matrix and/or a portion of the graph (e.g., subgraph) associated with the nodes associated with the pattern matrix based on traffic analysis system 110a determining a sequence of nodes and edges. For example, the sequence of nodes and edges may be randomly selected by selecting an initial node included in the pattern matrix and a subsequent node to include in the sequence, and the subsequent node may be selected based on the direction of the edges associated with the initial node (e.g., at each current node, randomly select one directional edge leading from that node to a subsequent node until either a predetermined number of iterations/steps of the sequence are taken and/or the current node has no directional edges leading therefrom). Traffic analysis system 110a may repeat this selection (e.g., an amount of times, such as a predetermined number of times, a selected number of times, and/or the like), setting the subsequent node as the current node and determining another subsequent node as described herein. The resulting sequence of nodes and edges may be associated with the pattern sequence data.

In some non-limiting embodiments or aspects, a random walk in a graph or directed graph $G=\{V, U\}$ may be a sequence of nodes $v_1, v_2, \ldots v_{k+1}$, where $(v_1, \in V)$, which may be or may not necessarily be distinct, and where $(v_i, v_{i+1}) \in E$. The sequence of nodes may include a predetermined number of nodes (e.g., 5 nodes, 10 nodes, 80 nodes, and/or the like). In some non-limiting embodiments or aspects, traffic analysis system 110a may perform a predetermined amount of random walks from one or more nodes in a graph (e.g., multiple (e.g., ten) walks per node for all nodes). When the consecutive nodes in the sequence are selected at random, traffic analysis system 110a may generate a random sequence of nodes known as the random walk on the graph. The probability of transition from node $v_i$ to $v_{i+1}$ may be a function of the out-degree of node $v_i$. Traffic analysis system 110a may explore the neighborhood of a respective node (e.g., other nodes connected by edges to the respective node) in a graph or a digraph by performing a random walk to determine the sequence of nodes described above. In some non-limiting embodiments or aspects, traffic analysis system 110a may employ a biased random walk procedure that efficiently explores a node neighborhood in breadth-first search, depth-first search, and/or the like fashion.

In some non-limiting embodiments or aspects, traffic analysis system 110a may perform a random-walk and combine the random walk with skip-gram based embedding methods to train a predictive model to identify feature representations f(u) for node u in a homogeneous graph $G'=\{V_{G'}, E_{G'}\}$ that predicts node u's context neighborhood N(u).

$$\max \sum_{u \in V_{G'}} \log Pr(N(u)|f(u)) \quad (1)$$

For example, traffic analysis system 110a may conduct a random walk on a graph (e.g., on the heterogeneous network, subgraphs of the heterogeneous network, and/or the like), a motif graph (e.g., a graph of a subgraph that is associated with a pattern of objects) and/or the like. As described herein, given a directed heterogeneous network G=(V, E, $T_V$, $T_E$) and a motif set M={$M_1$,$M_2$, ..., $M_T$}, traffic analysis system 110a may compute motif adjacency matrices {$W_{M1}$,$W_{M2}$, ..., $W_{MT}$}. The weighted motif adjacency matrix for motif $M_t$ may be defined as:

$(W_{M_t})_{i,j}$ =number of motif instances in $M_t \in M$
where nodes $i$ and $j$ ($i \neq j$) participate in $M_t$  (2)

The motif adjacency matrix (e.g., a motif co-occurrence matrix) may differ from a graph (e.g., a heterogeneous network) structurally. The motif graphs may capture pairwise relationships between nodes in the original graph with respect to a motif. The motif adjacency matrix may be symmetric, and in some examples, the motif adjacency matrix may be undirected. Some and/or all of the edges in the original graph may not exist in the motif graph, e.g., since the motif may not appear for a given edge. The edges in a motif graph may have different weights than the original graph, e.g., since the motif may appear at a different frequency than another random motif for a given edge. Thus, the number of edges in a weighted motif graph may be greater than the number of edges in the original graph.

Traffic analysis system 110a may transform a graph (e.g., a graph associated with and/or derived from a heterogeneous network) to a motif graph, e.g., in order to encode the heterogeneity in structural and semantics and/or conduct random walks on the motif graph itself. Additionally, traffic analysis system 110a may conduct random walks on the original graph (e.g., as further described below) to combine the structure of the graph with the edge weights in the motif graph (e.g., as further described below). As a result, traffic analysis system 110a may be able to account for higher-order global connectivity patterns as well as local neighborhood structure. In some examples, a random walk may not be dependent on the type of the node and/or edge associated with the node. In some non-limiting embodiments or aspects, graph meta-structure driven random walks may limit the scope of a walk to explore higher-order diverse neighborhoods. Additionally or alternatively, traffic analysis system 110a may aggregate the generated walk sequences and/or shuffle the generated walk sequences, e.g., before providing the generated walk sequences to a predictive model, as described herein. In some non-limiting embodiments or aspects, the graph transformation may be followed by a graph meta-structure independent random walk, which may enable the sequences to represent both higher-order heterogeneous network structural patterns as well as heterogeneous semantic relationships.

As shown in FIG. 3, at step 312, process 300 may include generating network sequence data. For example, traffic analysis system 110a may generate the network sequence data. Additionally or alternatively, the network sequence data may be associated with a portion of the heterogeneous network data (e.g., the heterogeneous network). In some non-limiting embodiments or aspects, traffic analysis system 110a may generate the network sequence data based on traffic analysis system 110a determining a random walk sample of the heterogeneous network. For example, traffic analysis system 110a may determine a sequence of nodes and edges included in the heterogeneous network by randomly selecting an initial node included in the heterogeneous network and a subsequent node to include in the sequence, the subsequent node selected based on the direction of the edges associated with the initial node. Traffic analysis system 110a may repeat this selection (e.g., an amount of times), setting the subsequent node as the initial node and determining another subsequent node as described herein. The resulting sequence of nodes and edges may be associated with the network sequence data.

As shown in FIG. 3, at step 314, process 300 may include combining the pattern sequence data and the network sequence data into combined sequence data. For example, traffic analysis system 110a may combine the pattern sequence data and the network sequence data into combined sequence data. In an example, traffic analysis system 110a may combine the pattern sequence data and the network sequence data into combined sequence data by concatenating the sequence of nodes and/or edges associated with the network sequence data to the sequence of nodes and/or edges associated with the network sequence data, the resulting concatenated sequences of nodes and/or edges associated with the combined sequence data.

As shown in FIG. 3, at step 316, process 300 may include generating a vector for each object. For example, traffic analysis system 110a may generate a vector for each object of the plurality of objects included in the heterogeneous network. In some non-limiting embodiments or aspects, traffic analysis system 110a may generate the vector for each object based on traffic analysis system 110a providing the combined sequence data as input to a predictive model. For example, traffic analysis system 110a may provide the combined sequence data as input to the predictive model and traffic analysis system 110a may receive vectors associated with each object. In some non-limiting embodiments or aspects, the vector associated with each object may be associated with a probability that the object will be included in a random walk sample of the heterogeneous network, the random walk sample determined by traffic analysis system 110a. In some non-limiting embodiments or aspects, the predictive model may be at least one of a neural network or a Skip-Gram model.

In some non-limiting embodiments or aspects, an exemplary algorithm associated with process 300 may be expressed in pseudocode as follows:

---

Algorithm 1

---

INPUT: Heterogeneous information network G = (V, E, $T_V$, $T_E$), motif set M = {$M_1$, ...$M_T$}, embedding dimension d, walks per node r, walk length l, neighborhood size k, return parameter p, in-out parameter q
OUTPUT: Latent node representations X ∈ $R^{|V| \times d}$
1:    Initialize X
2:    Initialize Ψ
3:    Ψ ← Discover-Motif-Instances(G, M)
4:    Initialize $W_M$
5:    for t = 1 to T do
6:        $W_{M_t}$ ← Create-Weighted-Motif-Graph (G, $M_t$, Ψ)
7:    Initialize walks
8:    for G and $W_{M_1}$, $W_{M_2}$, ..., $W_{M_T}$ do
9:        for all nodes u ∈ $V_{G'}$ do // current iter G' = {$V_{G'}$, $E_{G'}$}
10:       walk ← Generate-Random-Walk (G', u', l)
11:       Append walk to walks
12:    Initialize sequences
13:    sequences ← Shuffle (walks)

-continued

Algorithm 1

| 14: | X ← Skip-Gram-Model(sequences, k, d) |
| 15: | Return X |

In some non-limiting embodiments or aspects, traffic analysis system 110a may determine one or more classifications (e.g., embeddings, vector representations (e.g., feature vectors and/or the like), and/or the like) based on predictions generated based on the methods described herein. For example, traffic analysis system 110a may determine one or more embeddings based on output provided from a predictive model trained as described herein. In some examples, traffic analysis system 110a may train at least one other predictive model based on embeddings associated with nodes. For example, traffic analysis system 110a may provide the embeddings associated with the nodes as features to another predictive model (e.g., a classifier and/or the like). In some non-limiting embodiments or aspects, traffic analysis system 110a may conduct paper node multi-class classification for the heterogeneous network. For example, a classifier, parameter values, and train/test data may be selected for the various approaches for generating embeddings, e.g., to avoid any confounding factors. For example, traffic analysis system 110a may choose to use a naïve support vector machine (SVM) classifier (e.g., without any parameter tuning) and/or logistic regression (e.g., without any parameter tuning) for the heterogeneous network.

In some non-limiting embodiments or aspects, traffic analysis system 110a may determine one or more links that will be added to the heterogeneous network in the future (e.g., link prediction). For example, traffic analysis system 110a may determine (e.g., predict, determine the probability of, and/or the like) one or more links that may be added to the heterogeneous network (e.g., in the future), and, based on the determined one or more links, traffic analysis system 110a may generate a prediction (e.g., a prediction indicating an item a user is interested in). In some examples, traffic analysis system 110a may determine the one or more links based on one or more embeddings associated with one or more nodes. In some non-limiting embodiments or aspects, traffic analysis system 110a may partition the edges included in the heterogeneous network data and train a predictive model based on the links included in one partition. The links in the training set may be used by traffic analysis system 110a to generate the embeddings. The probability of a link appearing between two nodes in a heterogeneous network may be calculated by computing similarity between the respective feature vector embeddings. Examples of similarity metrics may include cosine (e.g., a range from zero to one), Pearson distribution (e.g., a range from zero to one), Euclidean distance, and/or the like. In some non-limiting embodiments or aspects, if the embedding-based similarity score between a pair of nodes is higher than a threshold, traffic analysis system 110a may infer that an edge could exist between the two nodes. In some non-limiting embodiments or aspects, in order to penalize (e.g., reduce the influence of) embeddings that generate a high similarity value for any random pair of nodes, traffic analysis system 110a may generate an equal number of fake links in a test file. Such fake links may correspond to links that do not exist in the original heterogeneous network. For the purpose of illustration, embeddings associated with such fake links may be expected to provide a similarity score less than the threshold since such links do not exist.

Referring now to FIGS. 4A-4G, illustrated are non-limiting embodiments or aspects of an implementation 400 relating to a process for generating embeddings for objects. As illustrated in FIGS. 4A-4G, implementation 400 may include transaction service provider system 410 and traffic analysis system 410a. In some non-limiting embodiments or aspects, transaction service provider system 410 may be the same as or similar to transaction service provider system 110. In some non-limiting embodiments or aspects, traffic analysis system 410a may be the same as or similar to traffic analysis system 110a.

Figure 4A:
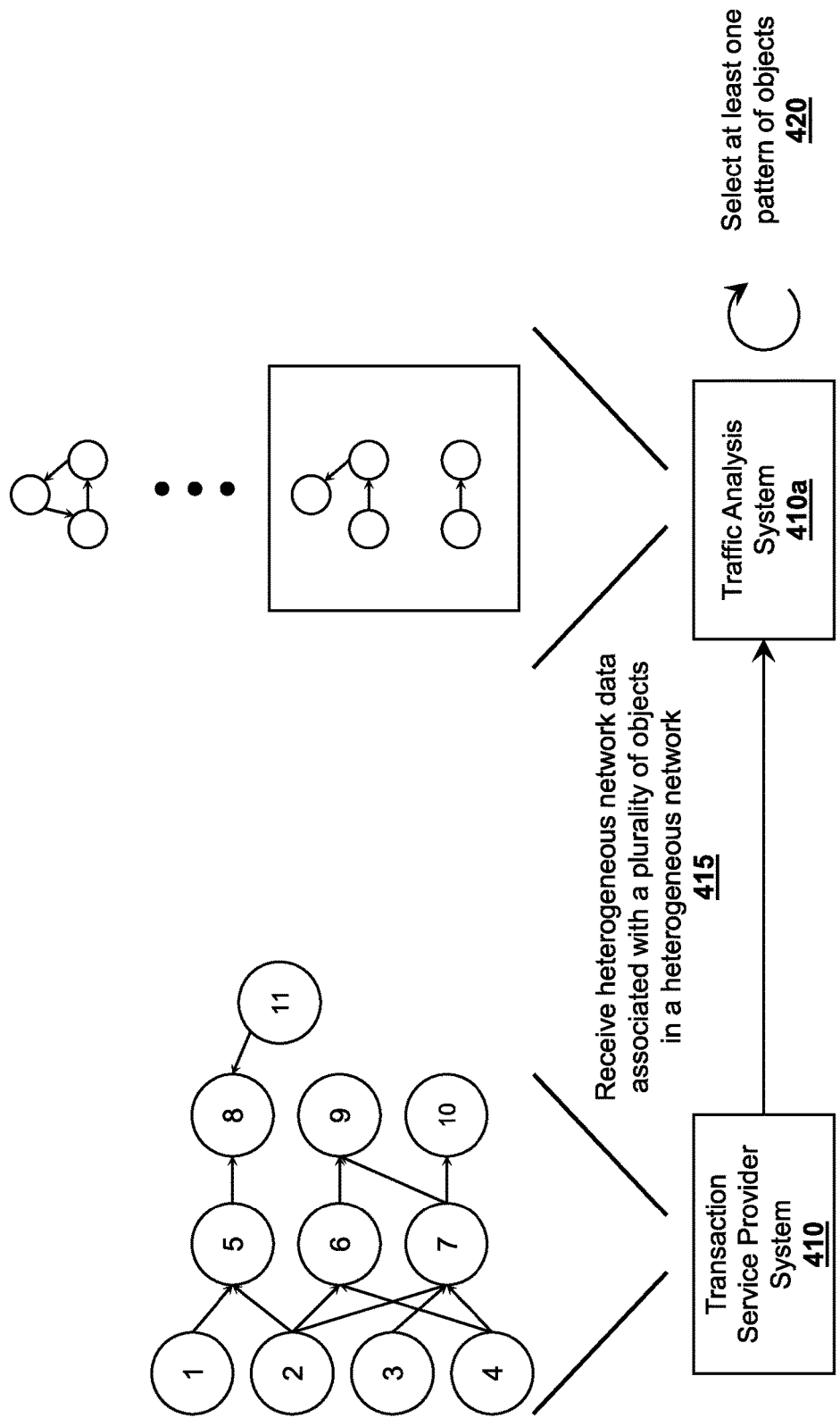

As shown by reference number 415 in FIG. 4A, traffic analysis system 410a may receive heterogeneous network data associated with a plurality of objects in a heterogeneous network. For example, traffic analysis system 410a may receive heterogeneous network data associated with a plurality of objects in a heterogeneous network from transaction service provider system 410. In some non-limiting embodiments or aspects, transaction service provider system 410 may receive the heterogeneous network data from one or more devices (e.g., one or more of the devices included in FIG. 1). In some non-limiting embodiments or aspects, the plurality of objects may include a plurality of nodes, where each node is connected to at least one other node of the plurality of nodes.

As shown by reference number 420 in FIG. 4A, traffic analysis system 410a may select at least one pattern of objects. For example, traffic analysis system 410a may select at least one pattern of objects from among a plurality of patterns of objects. In another example, traffic analysis system 410 may select a subset of patterns of objects from among the plurality of patterns of objects. In some non-limiting embodiments or aspects, one or more of the patterns of objects may be directional patterns (e.g., may be patterns from one node to one or more nodes in a sequence).

Figure 4B:
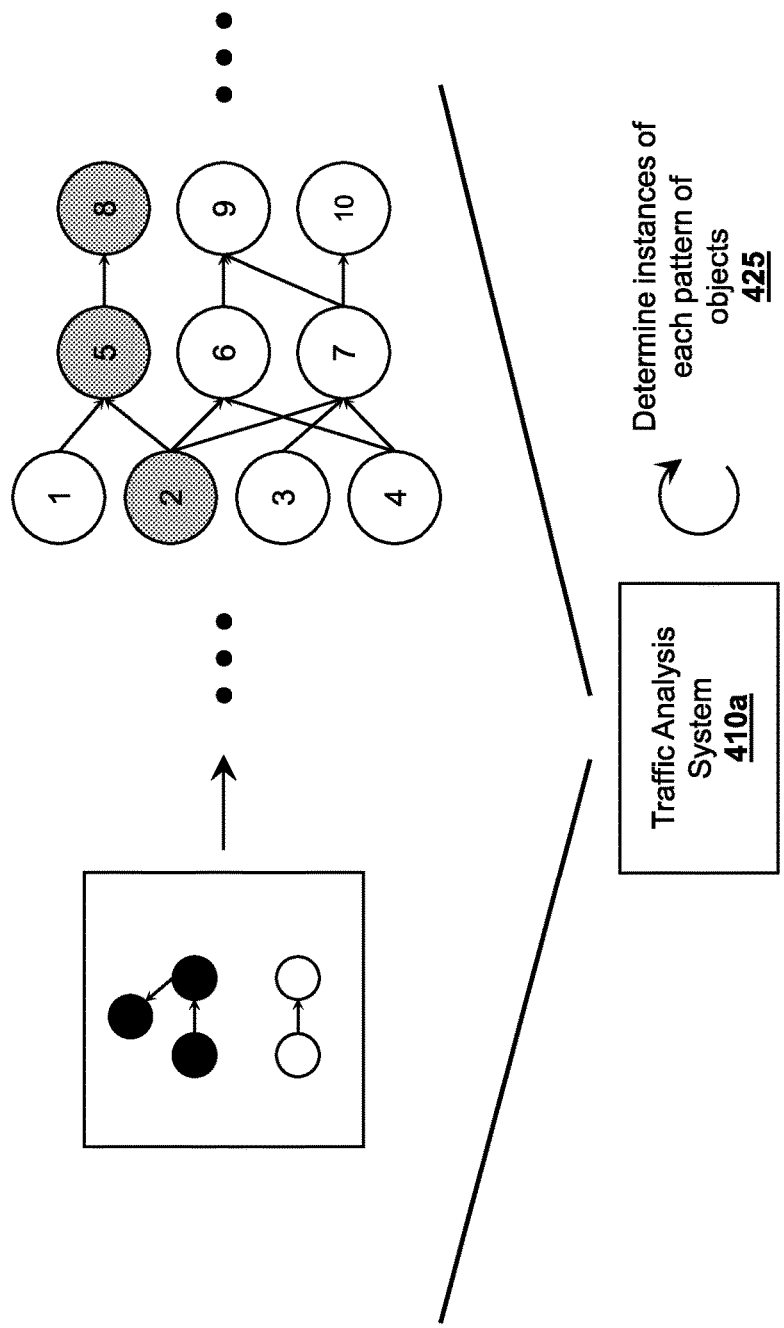

As shown by reference number 425 in FIG. 4B, traffic analysis system 410a may determine instances of each pattern of objects. For example, traffic analysis system 410a may determine instances of each pattern of objects associated with the plurality of objects in the heterogeneous network. As illustrated in FIG. 4B, for example, traffic analysis system 410a may identify a first instance of a pattern of objects from among a plurality of instances of patterns of objects from node 2 to node 5, and from node 5 to node 8.

Figure 4C:
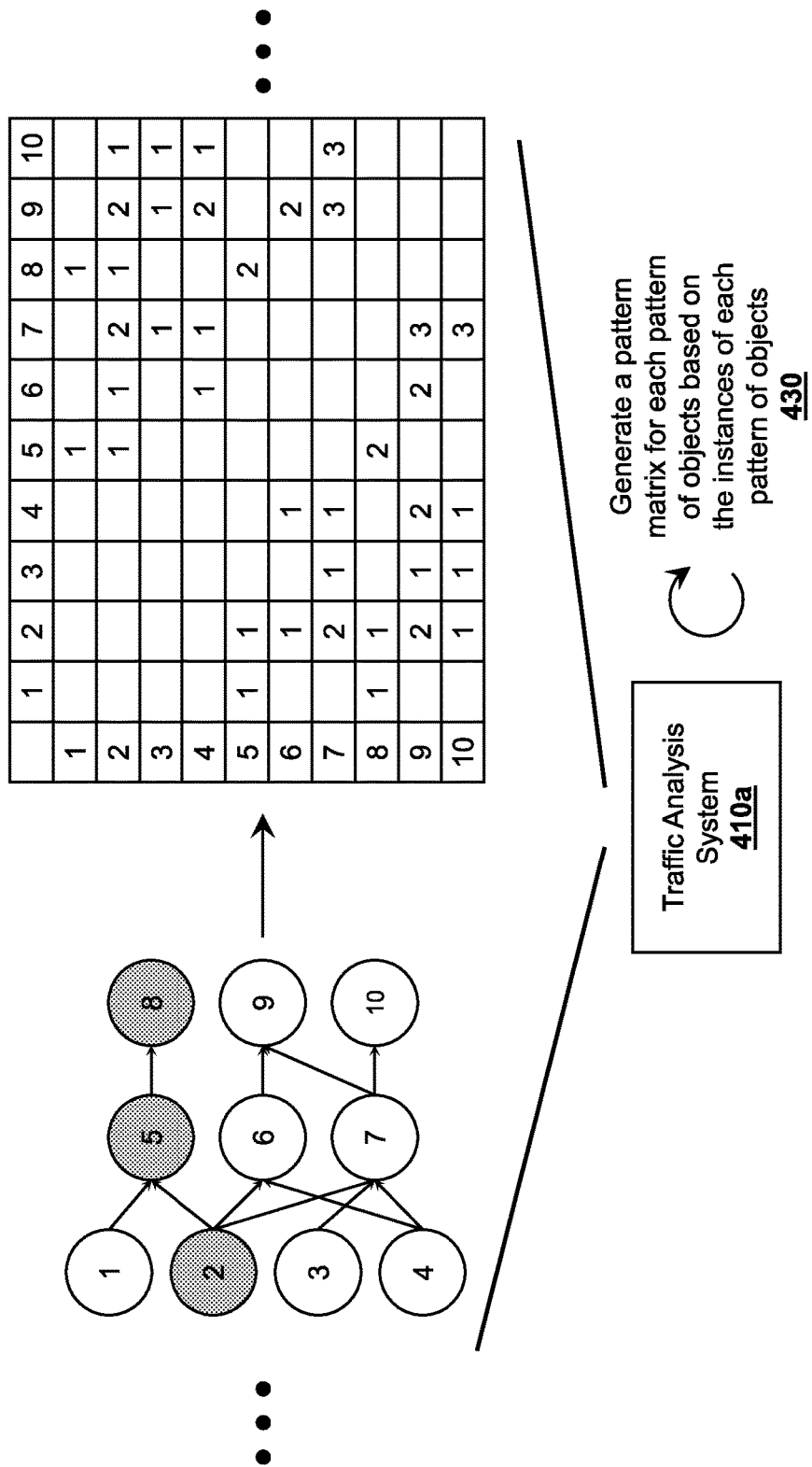

As shown by reference number 430 in FIG. 4C, traffic analysis system 410a may generate a pattern matrix for each pattern of objects based on the instances of each pattern of objects. For example, traffic analysis system 410a may generate the pattern matrix for each pattern of objects based on the instances of a pattern associated with the pattern matrix determined to be associated with the plurality of objects in the heterogeneous network. The pattern matrix may represent the amount of times a node is included in an instance of a pattern of objects selected from among the plurality of patterns of objects.

Figure 4D:

As shown by reference number 435 in FIG. 4D, traffic analysis system 410a may generate pattern sequence data associated with a portion of each pattern matrix. For example, traffic analysis system 410a may generate the pattern sequence data based on a pattern matrix for a pattern of objects. In an example, the portion of each pattern matrix for the pattern of objects may include a random walk sample of the pattern matrix.

Figure 4E:
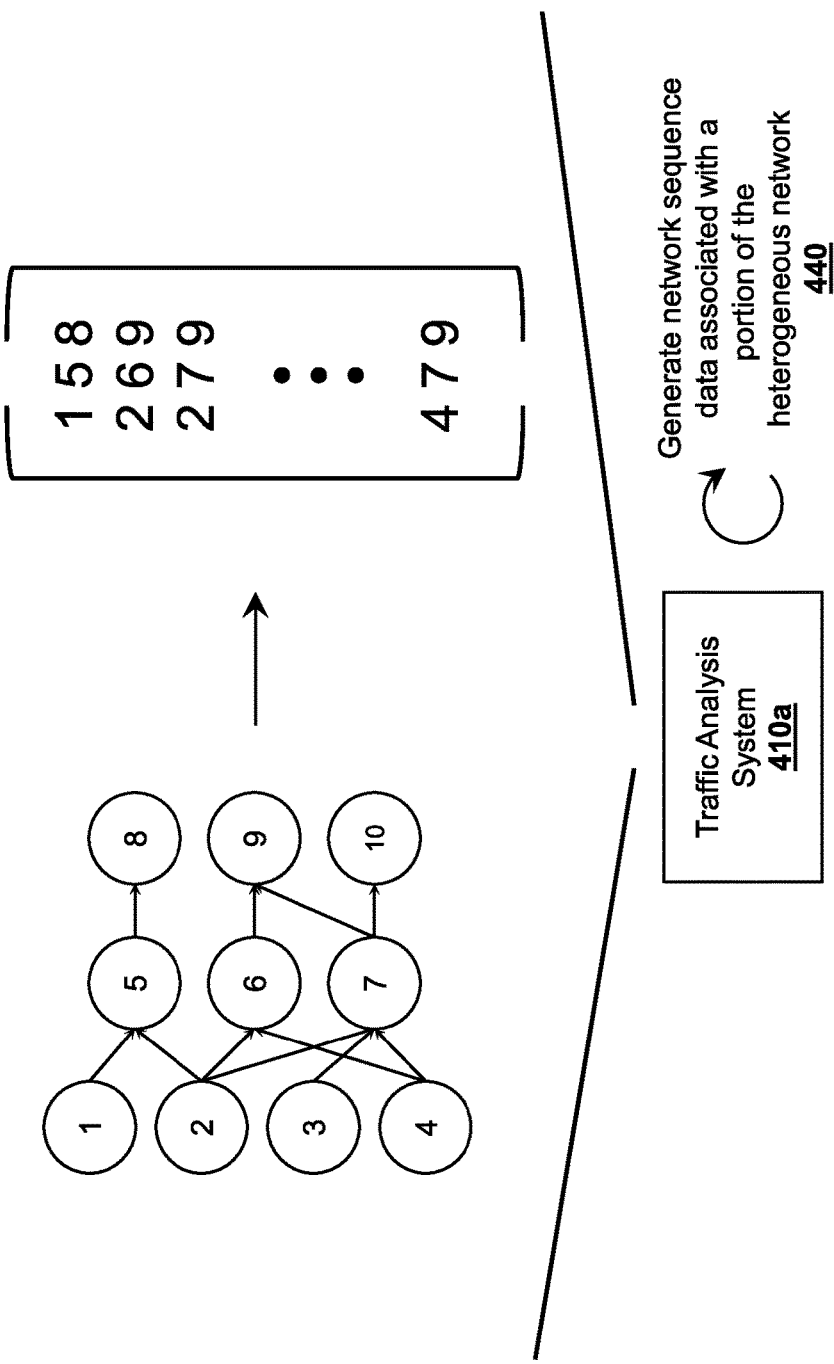

As shown by reference number 440 in FIG. 4E, traffic analysis system 410a may generate network sequence data associated with a portion of the heterogeneous network. For example, traffic analysis system 410a may generate the network sequence data associated with the portion of the heterogeneous network, where the portion of the heterogeneous network data includes a random walk sample of the heterogeneous network data.

As shown by reference number 445 in FIG. 4F, traffic analysis system 410a may combine the pattern sequence data and the network sequence data into combined sequence data. For example, traffic analysis system 410a may concatenate the pattern sequence data to the network sequence data to generate the combined sequence data.

Figure 4G:
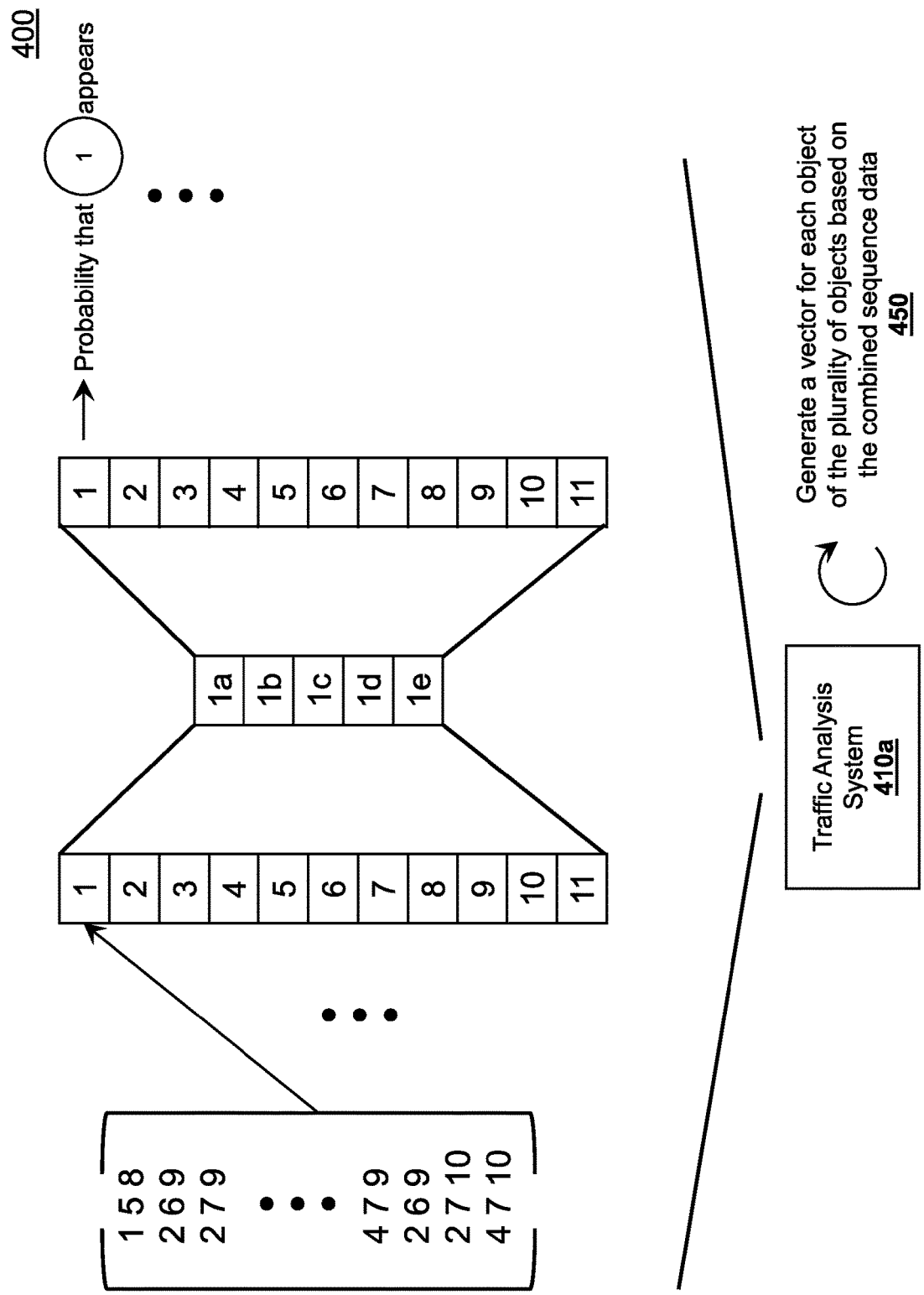

As shown by reference number 450 in FIG. 4G, traffic analysis system 410a may generate a vector for each object of the plurality of objects based on the combined sequence data. For example, traffic analysis system 410a may provide the combined sequence data to a predictive model (e.g., a neural network) to cause the predictive model to provide an output via one or more output neurons. In one example, traffic analysis system 410a may provide the combined sequence data as a first feature value to one or more input neurons of a neural network. In some examples, the amount of input neurons that may receive the combined sequence data may correspond to output neurons that provide predictions output by the neural network, the predictions based on feature values provided to the neurons that receive the combined sequence data. In some non-limiting embodiments or aspects, the input neurons and corresponding output neurons may be associated with (e.g., may correspond to) an object in the heterogeneous network.

In some non-limiting embodiments or aspects, the output neurons may provide predictions indicating the probability that the object associated with the input neuron that received the combined sequence data will be included in a random walk sample (e.g., a random walk sample of the heterogeneous network data that involves objects associated with one or more patterns of objects).

In some non-limiting embodiments or aspects, traffic analysis system 410a may determine one or more embeddings associated with one or more objects of the heterogeneous network. For example, traffic analysis system 410a may determine the one or more embeddings associated with the one or more objects of the heterogeneous network based on traffic analysis system 410a providing the combined sequence data as input to the predictive model. In an example, traffic analysis system 410a may determine the one or more embeddings associated with the one or more objects of the heterogeneous network based on traffic analysis system 410a providing the combined sequence data as input to the predictive model, where the embedding includes one or more values associated with (e.g., corresponding to) one or more values of one or more nodes associated with one or more hidden layers of the predictive model.

In some non-limiting embodiments or aspects, traffic analysis system 410a may determine a distance between two objects of the heterogeneous network. For example, traffic analysis system 410a may determine the distance between two objects of the heterogeneous network based on embeddings associated with each object. In an example, traffic analysis system 410a may determine the distance between the two objects of the heterogeneous network based on calculating the Euclidean distance between the two objects using the embeddings associated with each object. In some non-limiting embodiments or aspects, traffic analysis system 110a may derive the embeddings from values associated with a hidden layer of the predictive model.

Figure 5:
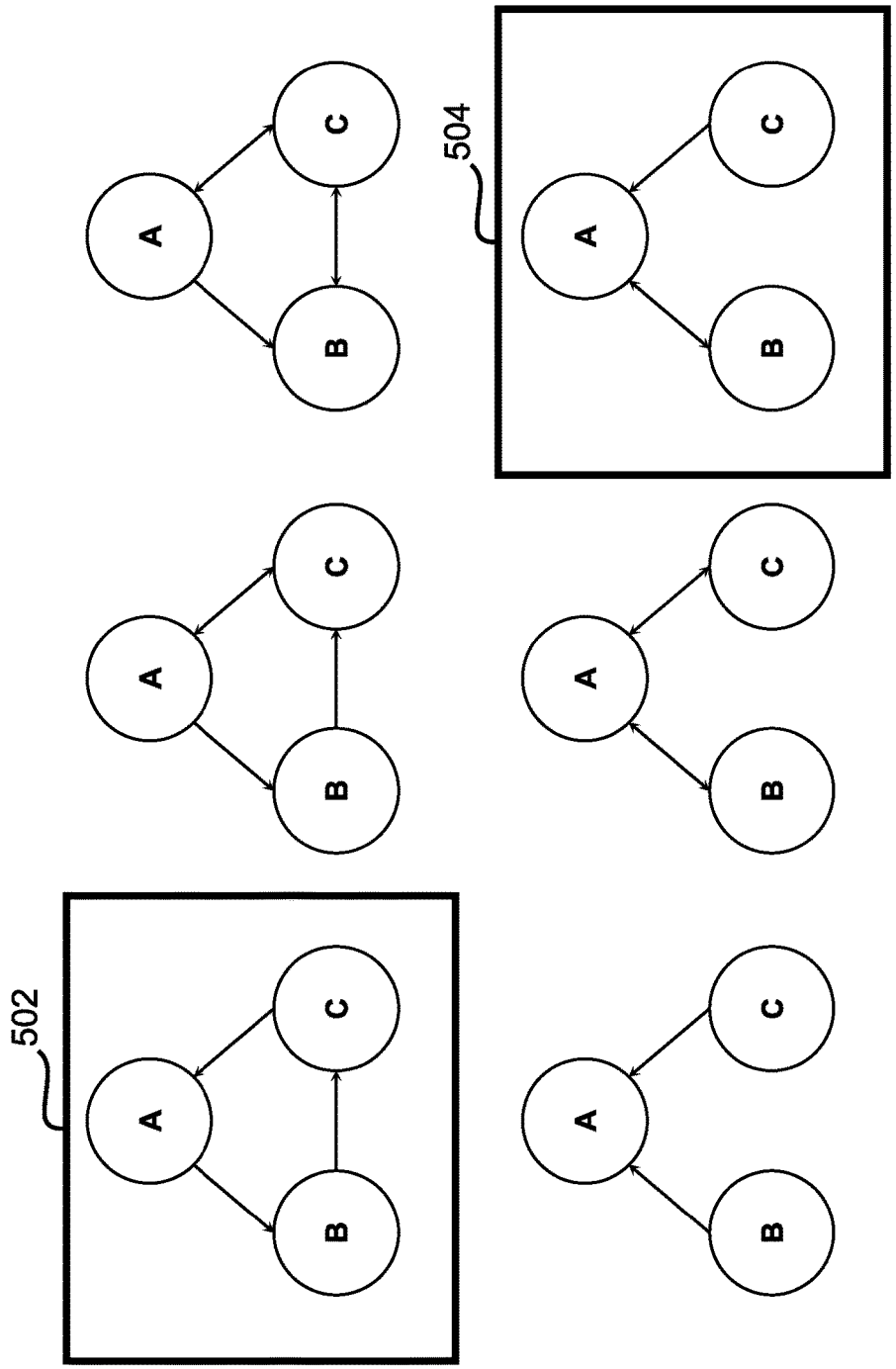
FIG. 5 is a diagram of non-limiting embodiments or aspects of example three-node patterns of objects.

Referring now to FIG. 5, illustrated is a diagram of non-limiting embodiments or aspects of example three-node patterns of objects (e.g., motifs). As illustrated, each pattern of objects may include one or more nodes connected via one or more edges. The one or more edges may be uni-directional or bi-directional. For example, as illustrated by pattern 502, node A may connect directionally (e.g., toward) via a uni-directional edge to node B, and node B may connect directionally (e.g., toward) via a uni-directional edge to node C. In another example, as illustrated by pattern 504, node A may connect bi-directionally (e.g., toward and from) via a bi-directional edge node B, and node C may connect directionally (e.g., toward) via a uni-directional edge to node A. In some non-limiting embodiments or aspects, there may be more and/or less nodes for any pattern. Additionally or alternatively, there may be more and/or less directional edges, the edges being either uni-directional or bi-directional.

Figure 6:
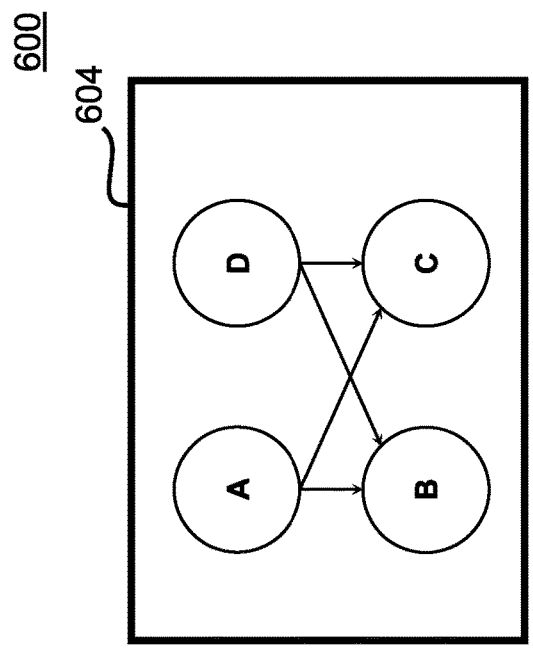
FIG. 6 is a diagram of non-limiting embodiments or aspects of example four-node patterns of objects.
Figure 6:
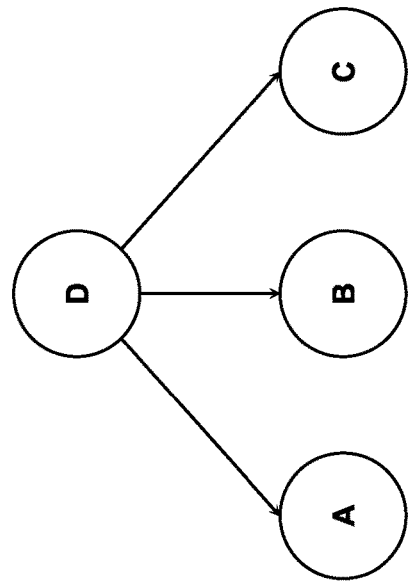
Figure 6:
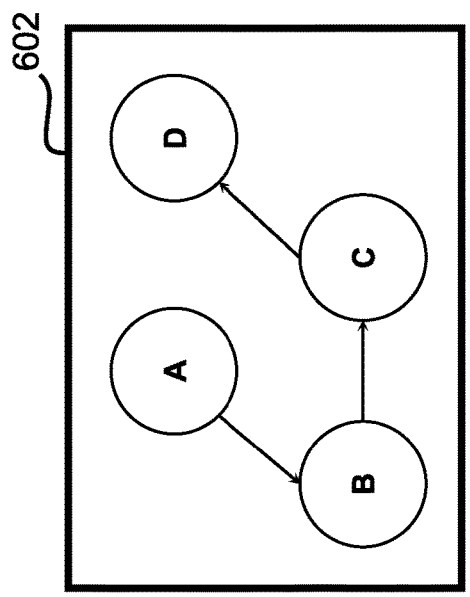
Figure 6:
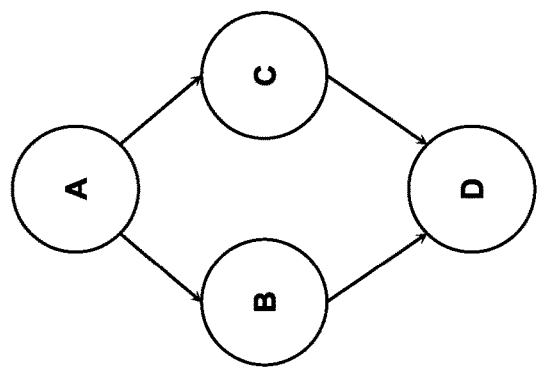

Referring now to FIG. 6, illustrated is a diagram of non-limiting embodiments or aspects of example four-node patterns of objects (e.g., motifs). As illustrated, each pattern of objects may include one or more nodes connected via one or more edges. The one or more edges may be uni-directional or bi-directional. For example, as illustrated by pattern 602, node A may connect directionally (e.g., toward) via a uni-directional edge to node B, node B may connect directionally (e.g., toward) via a uni-directional edge to node C, and node C may connect directionally (e.g., toward) via a uni-directional edge to node D. In another example, as illustrated by pattern 604, node A may connect directionally (e.g., toward) via uni-directional edges to nodes B and C, and node D may connect directionally (e.g., toward) via uni-directional edges to nodes B and C. In some non-limiting embodiments or aspects, there may be more and/or less nodes for any pattern. Additionally or alternatively, there may be more and/or less directional edges, the edges being either uni-directional or bi-directional.

Figure 7:
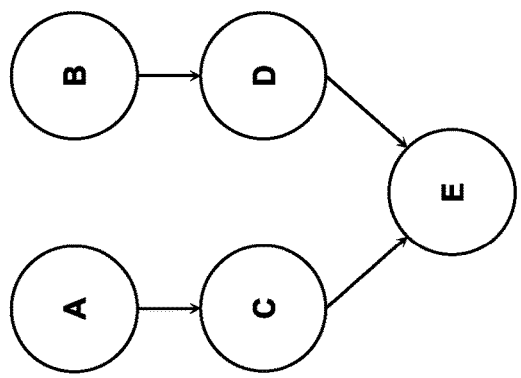
FIG. 7 is a diagram of non-limiting embodiments or aspects of example five-node patterns of objects.
Figure 7:
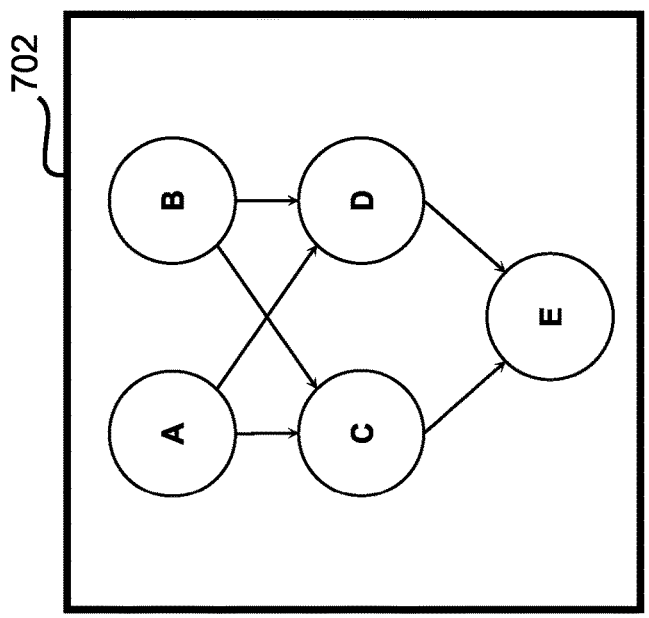

Referring now to FIG. 7, illustrated is a diagram of non-limiting embodiments or aspects of example five-node patterns of objects (e.g., motifs). As illustrated, each pattern of objects may include one or more nodes connected via one or more edges. The one or more edges may be uni-directional or bi-directional. For example, as illustrated by pattern 702, node A may connect directionally (e.g., toward) via uni-directional edges to nodes C and D, node B may connect directionally (e.g., toward) via uni-directional edges to nodes C and D, node C may connect directionally (e.g., toward) via a uni-directional edge to node E, and node D may connect directionally (e.g., toward) via a uni-directional edge to node E. In some non-limiting embodiments or aspects, there may be more and/or less nodes for any pattern. Additionally or alternatively, there may be more and/or less directional edges, the edges being either uni-directional or bi-directional.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method for generating embeddings of objects in a heterogeneous network, comprising:
   receiving, with at least one processor, heterogeneous network data associated with a plurality of objects in a heterogeneous network, each respective object of the plurality of objects associated with a respective entity of a plurality of entities, each object of the plurality of objects associated with an object type of a plurality of object types, each object of the plurality of objects connected to at least one other object of the plurality of objects by a relationship of a plurality of relationships, each relationship of the plurality of relationships associated with a relationship type of a plurality of relationship types, each relationship of the plurality of relationships being directional;
   selecting, with the at least one processor, at least one pattern of objects;
   determining, with the at least one processor, instances of each pattern of objects of the at least one pattern of objects based on the heterogeneous network data;
   generating, with the at least one processor, at least one pattern matrix comprising a pattern matrix for each pattern of objects based on the instances of each pattern of objects;
   generating, with the at least one processor, pattern sequence data associated with a portion of each pattern matrix of the at least one pattern matrix, the pattern sequence data comprising a sequence of objects and relationships associated with each pattern matrix;
   generating, with the at least one processor, network sequence data associated with a portion of the heterogeneous network data, the network sequence data comprising a sequence of objects and relationships associated with the heterogeneous network data;
   combining, with the at least one processor, the pattern sequence data and the network sequence data into combined sequence data, wherein combining comprises concatenating the sequence of objects and relationships associated with each pattern matrix and sequence of objects and relationships associated with the heterogeneous network data;
   generating, with the at least one processor, a plurality of vectors comprising a vector for each object of the plurality of objects based on the combined sequence data;
   predicting, with the at least one processor, at least one future relationship between at least two objects of the plurality of objects based on the plurality of vectors, wherein predicting comprises determining a probability that the at least one future relationship between the at least two objects will be added to the heterogeneous network data based on a respective vector of the plurality of vectors associated with each object of the at least two objects; and
   authorizing, with the at least one processor, at least one transaction based on predicting the at least one future relationship.

2. The method of claim 1, wherein the heterogeneous network data comprises heterogeneous graph data, wherein the plurality of objects comprises a plurality of nodes, wherein the plurality of relationships comprises a plurality of edges, and wherein each node of the plurality of nodes is connected to at least one other node of the plurality of nodes by an edge of the plurality of edges.

3. The method of claim 2, wherein each edge is directional.

4. The method of claim 2, wherein the plurality of object types comprises a plurality of node types, wherein each node comprises a node type of the plurality of node types, and wherein the node type comprises at least one of the following:
   a cardholder, an amount, a merchant, a merchant category code, a location, a transaction channel, a restaurant, a meal type, a city, or any combination thereof.

5. The method of claim 4, wherein the plurality of relationship types comprises a plurality of edge types, wherein each edge comprises an edge type of the plurality of edge types, the edge type comprising at least one of the following: spend, pay via, at, belongs to, pay to, located in, visit, eat, or any combination thereof.

6. The method of claim 1, wherein selecting the at least one pattern of objects comprises determining, with the at least one processor, the at least one pattern of objects has a frequency of occurrence that is statistically significant based on the heterogeneous network data.

7. The method of claim 6, wherein determining the at least one pattern of objects has the frequency of occurrence that is statistically significant comprises:
   extracting, with the at least one processor, the instances of each pattern of objects of the at least one pattern of objects from the heterogeneous network data using graph submatching;
   determining, with the at least one processor, the frequency of occurrence of the at least one pattern of objects based on the instances of each pattern of objects of the at least one pattern of objects; and
   determining, with the at least one processor, the frequency of occurrence of the at least one pattern of objects is statistically significant.

8. The method of claim 1, wherein each pattern of objects comprises a motif, and wherein each pattern matrix comprises a motif adjacency matrix, and wherein generating the at least one pattern matrix comprises:
   creating, with the at least one processor, a matrix for each respective motif, each row of the matrix associated with a first respective object of the plurality of objects in the heterogeneous network and each column of the matrix associated with a second respective object of the plurality of objects in the heterogeneous network;
   determining, with the at least one processor, weights for the matrix, each weight comprising a number of instances of the motif that includes the first respective object associated with a respective row of the matrix and the second respective object associated with a respective column of the matrix; and
   storing, with the at least one processor, the matrix as the motif adjacency matrix associated with the respective motif.

9. The method of claim 1, wherein the portion of each pattern matrix comprises a random walk sample of the pattern matrix; and
   wherein the portion of the heterogeneous network data comprises a random walk sample of the heterogeneous network data.

10. The method of claim 1, wherein generating the vector for each object of the plurality of objects comprises:
    inputting, with the at least one processor, the combined sequence data into a predictive model; and
    determining, with the at least one processor, the vector for each object of the plurality of objects based on an output of the predictive model.

11. The method of claim 10, wherein the predictive model comprises at least one of a neural network or a skip-gram model.

12. A system for generating embeddings of objects in a heterogeneous network, the system comprising:
at least one processor programmed or configured to:
receive heterogeneous network data associated with a plurality of objects in a heterogeneous network, each respective object of the plurality of objects associated with a respective entity of a plurality of entities, each object of the plurality of objects associated with an object type of a plurality of object types, each object of the plurality of objects connected to at least one other object of the plurality of objects by a relationship of a plurality of relationships, each relationship of the plurality of relationships associated with a relationship type of a plurality of relationship types, each relationship of the plurality of relationships being directional;
determine that at least one pattern of objects included in the heterogeneous network has a frequency of occurrence that is statistically significant;
select at least one pattern of objects based on determining that the at least one pattern of objects has the frequency of occurrence that is statistically significant;
determine instances of each pattern of objects of the at least one pattern of objects based on the heterogeneous network data;
generate at least one pattern matrix comprising a pattern matrix for each pattern of objects based on the instances of each pattern of objects;
generate pattern sequence data associated with a portion of each pattern matrix of the at least one pattern matrix, the pattern sequence data comprising a sequence of objects and relationships associated with each pattern matrix;
generate network sequence data associated with a portion of the heterogeneous network data, the network sequence data comprising a sequence of objects and relationships associated with the heterogeneous network data;
combine the pattern sequence data and the network sequence data into combined sequence data, wherein combining comprises concatenating the sequence of objects and relationships associated with each pattern matrix and sequence of objects and relationships associated with the heterogeneous network data;
generate a plurality of vectors comprising a vector for each object of the plurality of objects based on the combined sequence data;
predict at least one future relationship between at least two objects of the plurality of objects based on the plurality of vectors, wherein predicting comprises determining a probability that the at least one future relationship between the at least two objects will be added to the heterogeneous network data based on a respective vector of the plurality of vectors associated with each object of the at least two objects; and
authorize at least one transaction based on predicting the at least one future relationship.

13. The system of claim 12, wherein the heterogeneous network data comprises heterogeneous graph data, wherein the plurality of objects comprises a plurality of nodes, wherein the plurality of relationships comprises a plurality of edges, and wherein each node of the plurality of nodes is connected to at least one other node of the plurality of nodes by an edge of the plurality of edges.

14. The system of claim 12, wherein when determining the at least one pattern of objects included in the heterogeneous network has the frequency of occurrence that is statistically significant, the at least one processor is programmed or configured to:
extract the instances of each pattern of objects of the at least one pattern of objects from the heterogeneous network data using graph submatching;
determine the frequency of occurrence of the at least one pattern of objects based on the instances of each pattern of objects of the at least one pattern of objects; and
determine the frequency of occurrence of the at least one pattern of objects is statistically significant.

15. The system of claim 12, wherein each pattern of objects comprises a motif, and wherein each pattern matrix comprises a motif adjacency matrix, and wherein, when generating the at least one pattern matrix, the at least one processor is programmed or configured to:
create a matrix for each respective motif, each row of the matrix associated with a first respective object of the plurality of objects in the heterogeneous network and each column of the matrix associated with a second respective object of the plurality of objects in the heterogeneous network;
determine weights for the matrix, each weight comprising a number of instances of the motif that includes the first respective object associated with a respective row of the matrix and the second respective object associated with a respective column of the matrix; and
store the matrix as the motif adjacency matrix associated with the respective motif.

16. A computer program product for generating embeddings of objects in a heterogeneous network, comprising at least one non- transitory computer-readable medium comprising one or more instructions that, when executed by at least one processor, cause the at least one processor to:
receive heterogeneous network data associated with a plurality of objects in a heterogeneous network, each respective object of the plurality of objects associated with a respective entity of a plurality of entities, each object of the plurality of objects associated with an object type of a plurality of object types, each object of the plurality of objects connected to at least one other object of the plurality of objects by a relationship of a plurality of relationships, each relationship of the plurality of relationships associated with a relationship type of a plurality of relationship types, each relationship of the plurality of relationships being directional;
determine that at least one pattern of objects included in the heterogeneous network has a frequency of occurrence that is statistically significant;
select at least one pattern of objects based on determining that the at least one pattern of objects has the frequency of occurrence that is statistically significant;
determine instances of each pattern of objects of the at least one pattern of objects based on the heterogeneous network data;
generate at least one pattern matrix comprising a pattern matrix for each pattern of objects based on the instances of each pattern of objects;
generate pattern sequence data associated with a portion of each pattern matrix of the at least one pattern matrix, the pattern sequence data comprising a sequence of objects and relationships associated with each pattern matrix;

generate network sequence data associated with a portion of the heterogeneous network data, the network sequence data comprising a sequence of objects and relationships associated with the heterogeneous network data;

combine the pattern sequence data and the network sequence data into combined sequence data, wherein combining comprises concatenating the sequence of objects and relationships associated with each pattern matrix and sequence of objects and relationships associated with the heterogeneous network data;

generate a plurality of vectors comprising a vector for each object of the plurality of objects based on the combined sequence data;

predict at least one future relationship between at least two objects of the plurality of objects based on the plurality of vectors, wherein predicting comprises determining a probability that the at least one future relationship between the at least two objects will be added to the heterogeneous network data based on a respective vector of the plurality of vectors associated with each object of the at least two objects; and authorize at least one transaction based on predicting the at least one future relationship.

17. The computer program product of claim 16, wherein the heterogeneous network data comprises heterogeneous graph data, wherein the plurality of objects comprises a plurality of nodes, wherein the plurality of relationships comprises a plurality of edges, and wherein each node of the plurality of nodes is connected to at least one other node of the plurality of nodes by an edge of the plurality of edges.

18. The computer program product of claim 16, wherein the one or more instructions that cause the at least one processor to determine that the at least one pattern of objects included in the heterogeneous network has the frequency of occurrence that is statistically significant cause the at least one processor to:

extract the instances of each pattern of objects of the at least one pattern of objects from the heterogeneous network data using graph submatching;

determine the frequency of occurrence of the at least one pattern of objects based on the instances of each pattern of objects of the at least one pattern of objects; and determine the frequency of occurrence of the at least one pattern of objects is statistically significant.

19. The computer program product of claim 16, wherein each pattern of objects comprises a motif, and wherein each pattern matrix comprises a motif adjacency matrix, and wherein, when generating the at least one pattern matrix, the one or more instructions further cause the at least one processor to:

create a matrix for each respective motif, each row of the matrix associated with a first respective object of the plurality of objects in the heterogeneous network and each column of the matrix associated with a second respective object of the plurality of objects in the heterogeneous network;

determine weights for the matrix, each weight comprising a number of instances of the motif that includes the first respective object associated with a respective row of the matrix and the second respective object associated with a respective column of the matrix; and store the matrix as the motif adjacency matrix associated with the respective motif.

20. The computer program product of claim 16, wherein the one or more instructions that cause the at least one processor to generate the vector for each object of the plurality of objects cause the at least one processor to:

input the combined sequence data into a predictive model; and determine the vector for each object of the plurality of objects based on an output of the predictive model.

* * * * *

UNITED STATES PATENT AND TRADEMARK OFFICE
CERTIFICATE OF CORRECTION

| | | |
|---|---|---|
| PATENT NO. | : 12,039,513 B2 | Page 1 of 1 |
| APPLICATION NO. | : 17/297000 | |
| DATED | : July 16, 2024 | |
| INVENTOR(S) | : Manoj Reddy Dareddy et al. | |

It is certified that error appears in the above-identified patent and that said Letters Patent is hereby corrected as shown below:

In the Claims

Column 27, Line 41, Claim 1, delete "sequence" and insert -- the sequence --

Column 29, Line 47, Claim 12, delete "sequence" and insert -- the sequence --

Column 30, Line 36, Claim 16, delete "non- transitory" and insert -- non-transitory --

Column 31, Line 10, Claim 16, delete "sequence" and insert -- the sequence --

Signed and Sealed this
Eighth Day of October, 2024

Katherine Kelly Vidal
*Director of the United States Patent and Trademark Office*